US009435703B2

(12) United States Patent
Maehara et al.

(10) Patent No.: US 9,435,703 B2
(45) Date of Patent: Sep. 6, 2016

(54) TORQUE SENSOR

(71) Applicant: KAYABA INDUSTRY CO., LTD., Minato-ku, Tokyo (JP)

(72) Inventors: Hideo Maehara, Gifu (JP); Ryota Yamada, Gifu (JP); Kazuhiko Tsutsumi, Gifu (JP); Takayuki Hayashi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/386,397

(22) PCT Filed: Jan. 31, 2013

(86) PCT No.: PCT/JP2013/052257
§ 371 (c)(1),
(2) Date: Sep. 19, 2014

(87) PCT Pub. No.: WO2013/140864
PCT Pub. Date: Sep. 26, 2013

(65) Prior Publication Data
US 2015/0040686 A1 Feb. 12, 2015

(30) Foreign Application Priority Data

Mar. 22, 2012 (JP) ................................ 2012-065755
Mar. 22, 2012 (JP) ................................ 2012-065765

(51) Int. Cl.
*G01L 3/02* (2006.01)
*G01L 3/10* (2006.01)
(Continued)

(52) U.S. Cl.
CPC .............. *G01L 3/101* (2013.01); *B62D 15/02* (2013.01); *G01L 5/221* (2013.01); *G01D 5/145* (2013.01); *G01L 3/105* (2013.01)

(58) Field of Classification Search
CPC ....... G01L 3/101; G01L 5/221; G01L 3/105; B62D 6/10; B62D 15/02; G01D 5/145
USPC ........ 73/962.331–862.336, 862.331–862.336
See application file for complete search history.

(56) References Cited

U.S. PATENT DOCUMENTS

| 4,984,474 A | 1/1991 | Matsushima et al. |
| 2004/0056748 A1* | 3/2004 | Masaki ................... B62D 6/10 336/119 |

(Continued)

FOREIGN PATENT DOCUMENTS

| EP | 1464935 A1 | 10/2004 |
| JP | 348714 U | 5/1991 |

(Continued)

OTHER PUBLICATIONS

International Search Report and Written Opinion mailed Feb. 26, 2013, corresponding to International patent application No. PCT/JP2013/052257.

(Continued)

*Primary Examiner* — Max Noori
(74) *Attorney, Agent, or Firm* — Hauptman Ham, LLP

(57) ABSTRACT

A torque sensor includes a magnetism generation portion that rotates together with a first shaft, a rotating magnetic circuit portion that rotates together with a second shaft, a fixed magnetic circuit portion fixed to a housing, a magnetism detector that detects a magnetic flux density guided from the magnetism generation portion to the fixed magnetic circuit portion through the rotating magnetic circuit portion in accordance with torsional deformation of the torsion bar, and a shield disposed between the rotating magnetic circuit portion and the magnetism detector in order to shield the magnetism detector magnetically.

10 Claims, 23 Drawing Sheets

(51) Int. Cl.
*B62D 15/02* (2006.01)
*G01L 5/22* (2006.01)
*G01D 5/14* (2006.01)

(56) References Cited

U.S. PATENT DOCUMENTS

| | | | |
|---|---|---|---|
| 2004/0074316 A1* | 4/2004 | Nakane | G01L 5/221 |
| | | | 73/862.333 |
| 2004/0194560 A1 | 10/2004 | Froehlich et al. | |
| 2013/0192390 A1* | 8/2013 | Shidahara | G01L 3/101 |
| | | | 73/862.325 |
| 2013/0220030 A1* | 8/2013 | Nishikawa | G01L 3/101 |
| | | | 73/862.331 |
| 2013/0312539 A1* | 11/2013 | Shimomura | G01L 3/104 |
| | | | 73/862.325 |

FOREIGN PATENT DOCUMENTS

| | | |
|---|---|---|
| JP | 2004309463 A | 11/2004 |
| JP | 2006162557 A | 6/2006 |
| JP | 2008203176 A | 9/2008 |
| JP | 2009244205 A | 10/2009 |
| JP | 2011209005 A | 10/2011 |

OTHER PUBLICATIONS

Extended European Search Report dated Aug. 31, 2015, corresponding to European Patent Application No. 13763845.8.

* cited by examiner

TORQUE SENSOR

TECHNICAL FIELD

The present invention relates to a torque sensor that detects torque acting on a torsion bar.

BACKGROUND ART

A non-contact type torque sensor that detects steering torque acting on a steering shaft by magnetic force is known as a torque sensor provided in a steering apparatus of a vehicle.

JP2009-244205A discloses a torque sensor including a magnetism generation portion fixed to an input shaft, a rotating magnetic circuit portion fixed to an output shaft, a fixed magnetic circuit portion fixed to a housing, and a magnetism sensor that detects a magnetic flux density guided to the fixed magnetic circuit portion.

When torque acts on a torsion bar that connects the input shaft to the output shaft so that the torsion bar undergoes torsional deformation, a relative position in a rotation direction between the magnetism generation portion and the rotating magnetic circuit portion varies. Accordingly, the magnetic flux density guided to the fixed magnetic circuit portion from the magnetism generation portion through the rotating magnetic circuit portion also varies. The magnetism sensor outputs a signal corresponding to the magnetic flux density. The torque acting on the torsion bar is detected on the basis of the signal output from the magnetism sensor.

SUMMARY OF INVENTION

Referring to FIG. 23, a path of magnetic flux accompanying torsional deformation of a torsion bar will be described. As shown by straight line arrows in FIG. 23, a magnetic flux path between a rotating magnetic circuit portion and a fixed magnetic circuit portion extends from an N pole of a permanent magnet 91 of a magnetism generation portion toward an S pole of the permanent magnet 91 via a first soft magnetic ring 92 of the rotating magnetic circuit portion, a first magnetic flux collecting ring (not shown) of the fixed magnetic circuit portion, a first magnetic flux collecting yoke 93, a second magnetic flux collecting yoke 94, and a second magnetic flux collecting ring (not shown), and a second soft magnetic ring 95 of the rotating magnetic circuit portion. A magnetism sensor 96 is disposed between the first magnetic flux collecting yoke 93 and the second magnetic flux collecting yoke 94.

Here, as shown by curved line arrows in FIG. 23, flux leakage exists in the rotating magnetic circuit portion between the first soft magnetic ring 92 and the second soft magnetic ring 95. When the magnetism sensor 96 is disposed close to the input and output shafts in order to reduce the size of the apparatus, the magnetism sensor 96 is exposed to the flux leakage in the rotating magnetic circuit portion so as to be affected by the flux leakage, and as a result, the torque sensor generates a detection error.

The present invention has been designed in consideration of the problem described above, and an object thereof is to improve a detection precision of a torque sensor.

According to one aspect of present invention, a torque sensor that detects torque acting on a torsion bar that connects a first shaft and a second shaft, which are supported in a housing to be free to rotate is provided. The torque sensor includes a magnetism generation portion that rotates together with the first shaft, a rotating magnetic circuit portion that rotates together with the second shaft, a fixed magnetic circuit portion fixed to the housing, a magnetism detector that detects a magnetic flux density guided from the magnetism generation portion to the fixed magnetic circuit portion through the rotating magnetic circuit portion in accordance with torsional deformation of the torsion bar, and a shield disposed between the rotating magnetic circuit portion and the magnetism detector in order to shield the magnetism detector magnetically.

DESCRIPTION OF EMBODIMENTS

Figure 1:
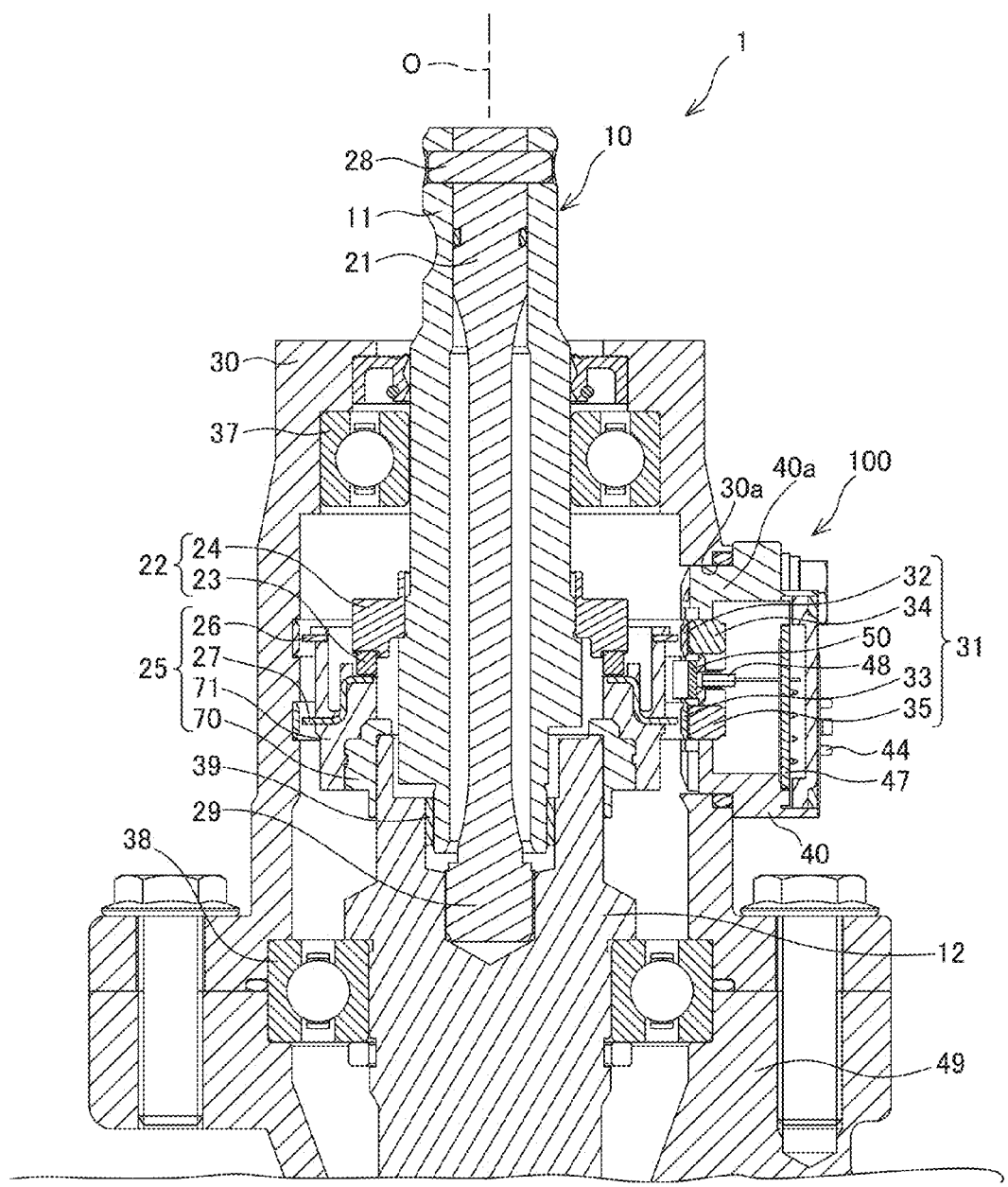
FIG. 1 is a longitudinal sectional view of an electric power steering apparatus to which a torque sensor according to a first embodiment of the present invention is applied.

Referring to the figures, embodiments of the present invention will be described.

(First Embodiment)

Referring to FIGS. 1 to 9, a torque sensor 100 according to a first embodiment of the present invention will be described.

First, referring to FIG. 1, an electric power steering apparatus 1 to which the torque sensor 100 according to the first embodiment of the present invention is applied will be described.

In the electric power steering apparatus 1, a steering shaft 10 and an output shaft 12 rotate in conjunction with a steering wheel such that a rack shaft that meshes with a pinion provided on a lower end of the output shaft 12 moves in an axial direction. As a result, a vehicle wheel is steered.

Further, the electric power steering apparatus 1 includes, as an assist mechanism for applying auxiliary steering torque, a worm wheel coupled to the output shaft 12, a worm that meshes with the worm wheel, and an electric motor that drives the worm to rotate. The electric power steering apparatus 1 uses the electric motor to apply the auxiliary steering torque to the output shaft 12.

The steering shaft 10 includes an input shaft 11 serving as a first shaft, and a torsion bar 21 coupled to the input shaft 11. The input shaft 11 is supported on a housing 30 to be free to rotate via a roller bearing 37. The output shaft 12, which serves as a second shaft, is supported on a housing 49 to be free to rotate via a roller bearing 38. A slide bearing 39 is interposed between a lower end side of the input shaft 11 and an upper end side of the output shaft 12. The input shaft 11 and the output shaft 12 are supported on the housings 30, 49 to be free to rotate coaxially.

The input shaft 11 is formed in a cylindrical shape, and the torsion bar 21 is housed in the interior of the input shaft 11 coaxially therewith. An upper end portion of the torsion bar 21 is coupled to an upper end portion of the input shaft 11 via a pin 28. A lower end portion of the torsion bar 21 projects from a lower end opening portion of the input shaft 11, and is coupled to the output shaft 12 via a serration 29. The torsion bar 21 transmits steering torque input into the input shaft 11 via a steering wheel to the output shaft 12, and undergoes torsional deformation about a rotary axis O in accordance with the steering torque.

The electric power steering apparatus 1 is provided with the non-contact type torque sensor 100, which detects the steering torque acting on the torsion bar 21 that connects the input shaft 11 to the output shaft 12. The torque sensor 100 will be described below.

The torque sensor 100 includes a magnetism generation portion 22 fixed to the input shaft 11 so as to rotate together with the input shaft 11, a rotating magnetic circuit portion 25 fixed to the output shaft 12 so as to rotate together with the output shaft 12, a fixed magnetic circuit portion 31 fixed to the housing 30, and a magnetism sensor 48 serving as a magnetism detector for detecting a magnetic flux density that is guided to the fixed magnetic circuit portion 31 from the magnetism generation portion 22 via the rotating magnetic circuit portion 25 in accordance with the torsional deformation of the torsion bar 21. The torque sensor 100 detects the steering torque acting on the torsion bar 21 on the basis of an output of the magnetism sensor 48.

Instead of the configuration described above, the magnetism generation unit 22 may be fixed to the output shaft 12 so as to rotate together with the output shaft 12, and the rotating magnetic circuit portion 25 may be fixed to the input shaft 11 so as to rotate together with the input shaft 11.

Figure 2:
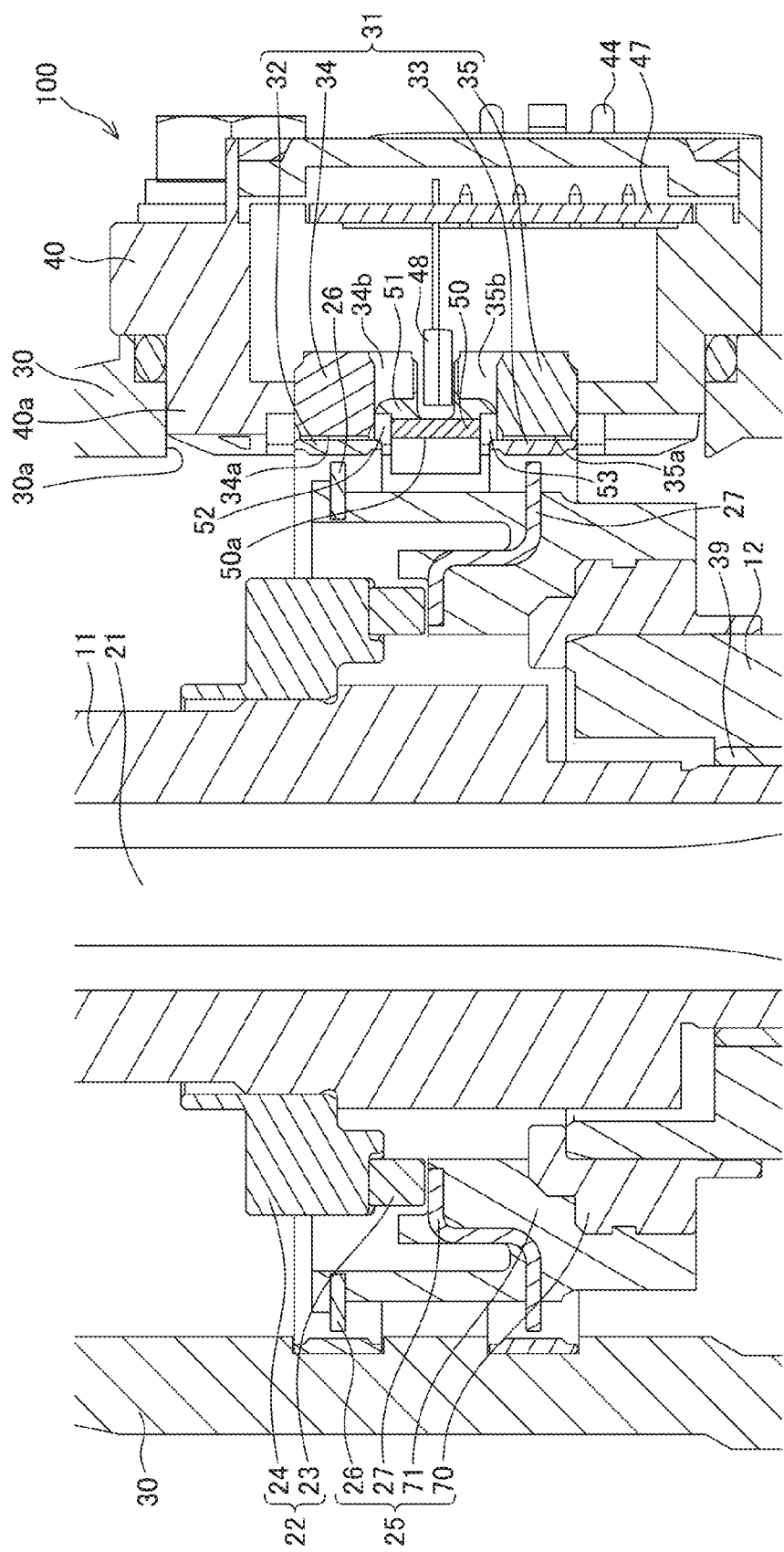
FIG. 2 is a partially enlarged view of FIG. 1.
Figure 3:
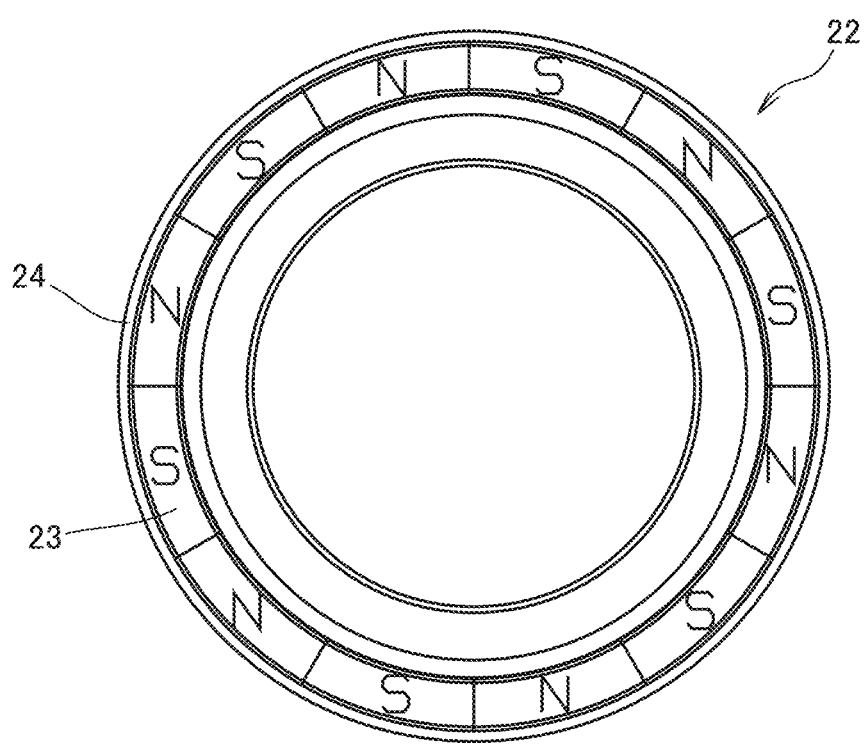
FIG. 3 is a bottom view of a magnetism generation portion.
Figure 4:
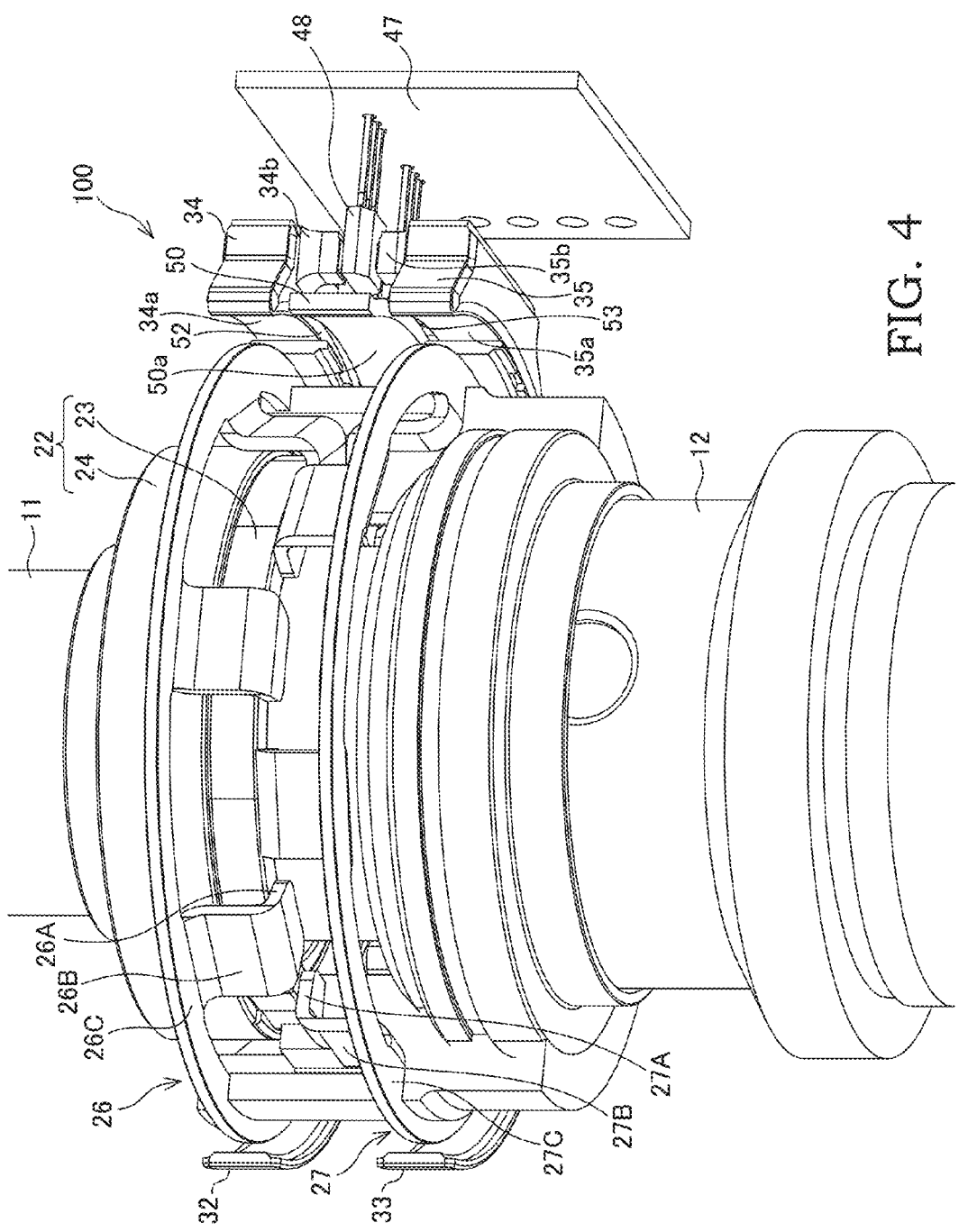
FIG. 4 is a perspective view of the torque sensor according to the first embodiment of the present invention in a condition where a housing has been removed.
Figure 5:
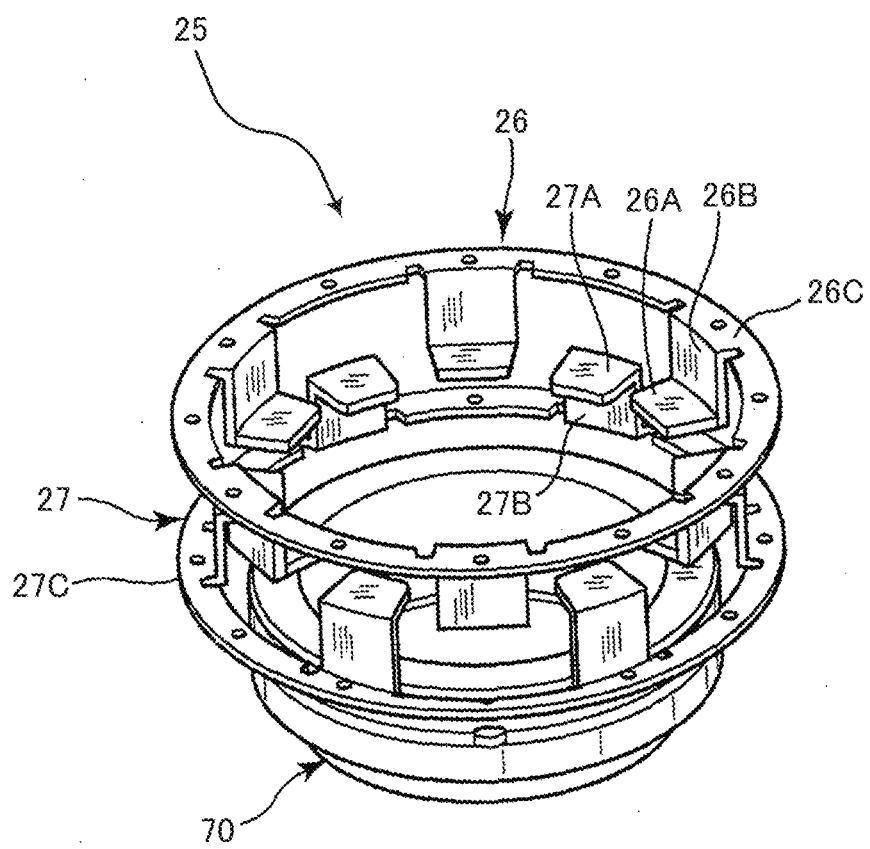
FIG. 5 is a perspective view of a rotating magnetic circuit portion.
Figure 6:
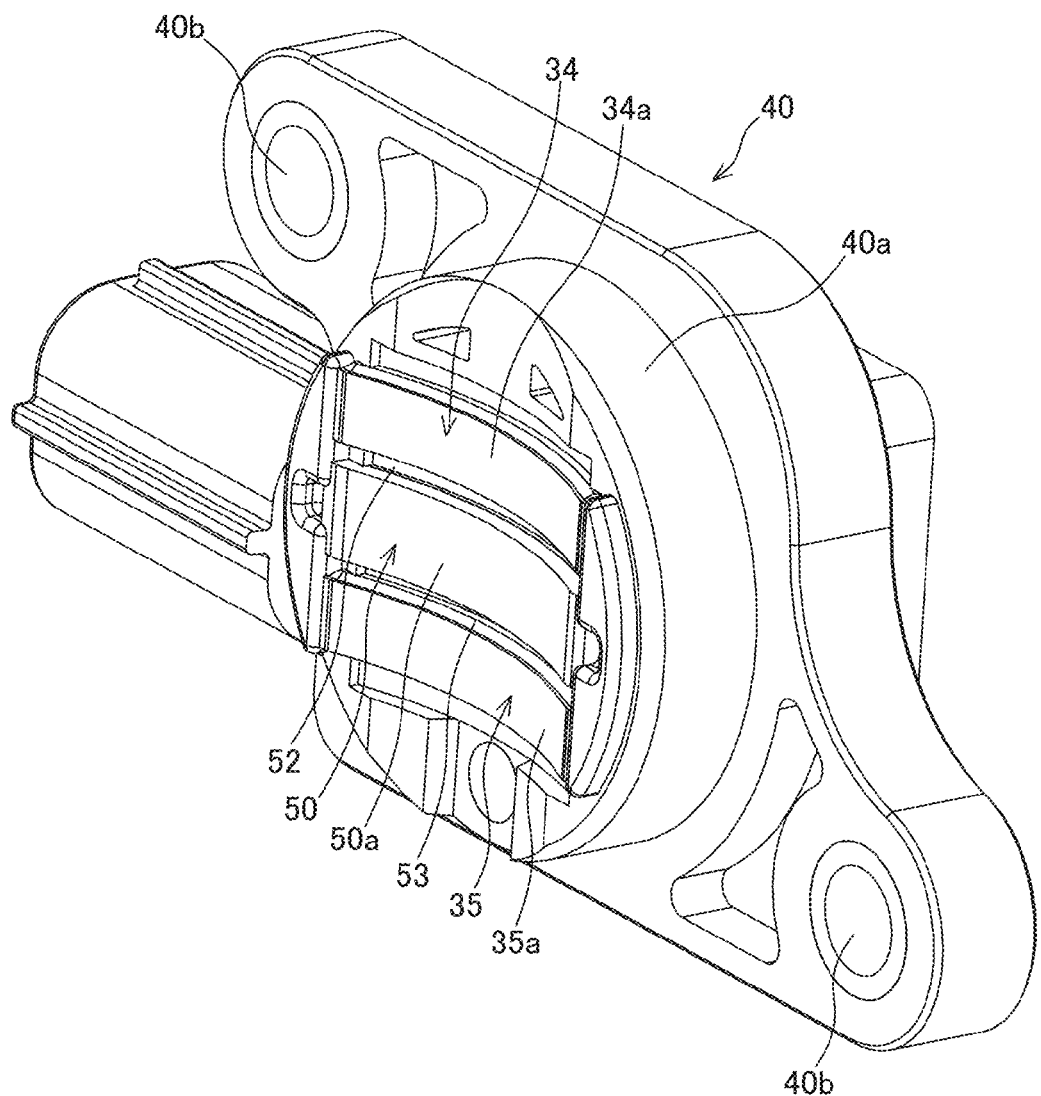
FIG. 6 is a perspective view of a sensor holder.
Figure 7:
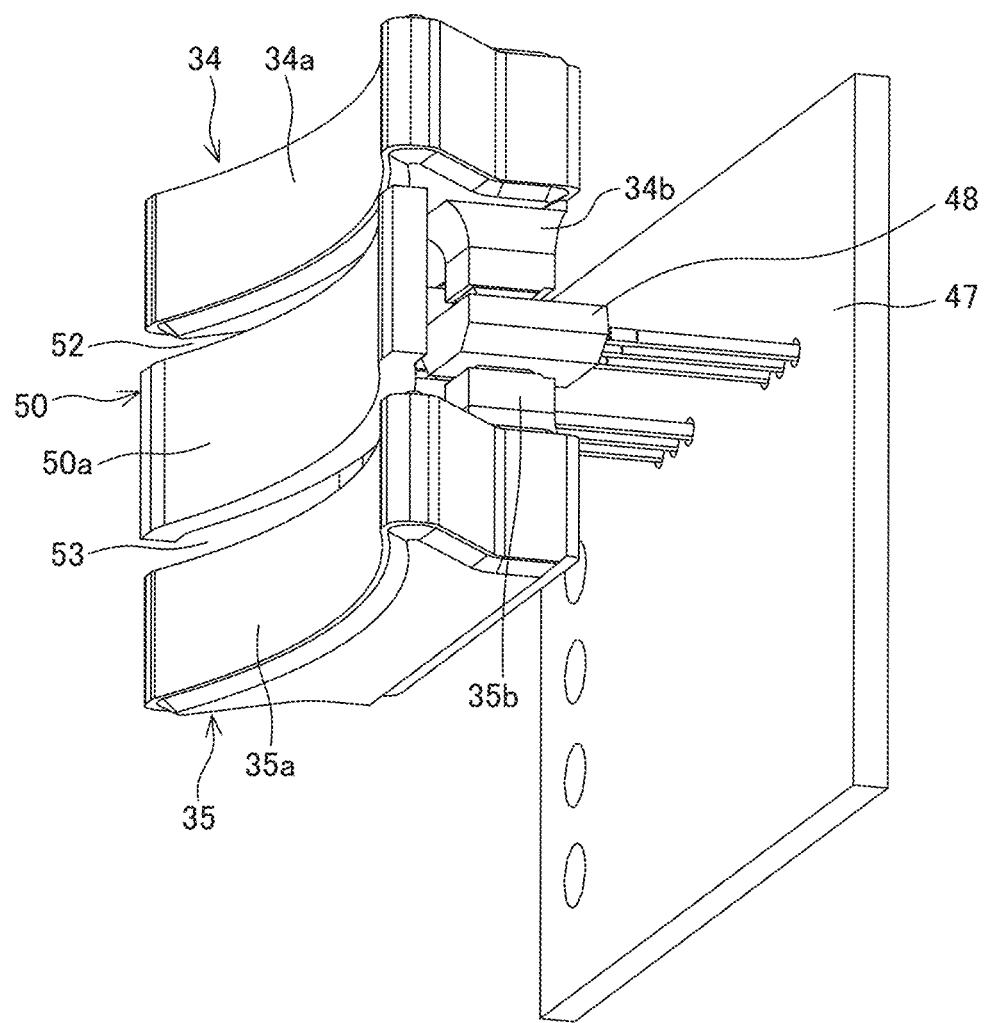
FIG. 7 is a perspective view of a magnetic flux collecting yoke.

As shown in FIGS. 1 to 3, the magnetism generation portion 22 includes an annular back yoke 24 press-fitted to the input shaft 11, and an annular ring magnet 23 joined to a lower end surface of the back yoke 24.

The ring magnet 23 is an annular permanent magnet that generates magnetism in the direction of the rotary axis O of the input shaft 11. The ring magnet 23 is a multipolar magnet formed by polarizing a hard magnetic material in the rotary axis O direction, and has twelve magnetic poles formed at equal widths in a circumferential direction. In other words, six N poles and six S poles are disposed alternately in the circumferential direction on an upper end surface and a lower end surface of the ring magnet 23. The number of magnetic poles formed on the end surfaces of the ring magnet 23 may be set as desired within a range of two or more.

An upper portion magnetic pole surface serving as the upper end surface of the ring magnet 23 is fixed to the lower end surface of the back yoke 24 via an adhesive. Further, the back yoke 24 is formed from a soft magnetic material, and is therefore magnetized by a magnetic field exerted thereon by the ring magnet 23 so as to be adsorbed to the ring magnet 23. Hence, the ring magnet 23 and the back yoke 24 are joined by both an adhesive force of the adhesive and a magnetic force. The back yoke 24 functions both as a connecting member that connects the ring magnet 23 to the input shaft 11, and a yoke that guides magnetic flux by linking adjacent magnetic poles of the ring magnet 23, whereby a magnetic force is collected on a lower portion magnetic pole surface serving as the lower end surface of the ring magnet 23.

As shown in FIGS. 1, 2, 4, and 5, the rotating magnetic circuit portion 25 includes a first soft magnetic ring 26 and a second soft magnetic ring 27 to which magnetic flux generated by the ring magnet 23 of the magnetism generation portion 22 is guided, an attachment member 70 attached to the output shaft 12, and a mold resin 71 for fixing the first soft magnetic ring 26 and the second soft magnetic ring 27 to the attachment member 70.

The first soft magnetic ring 26 includes an annular first magnetic path ring portion 26C, six first magnetic path column portions 26B projecting downward from the first magnetic path ring portion 26C, and first magnetic path tip end portions 26A that are bent inward from lower ends of the respective first magnetic path column portions 26B so as to face the lower end surface of the ring magnet 23. The second soft magnetic ring 27 includes an annular second magnetic path ring portion 27C, six second magnetic path column portions 27B projecting upward from the second magnetic path ring portion 27C, and second magnetic path tip end portions 27A that are bent inward from upper ends of the respective second magnetic path column portions 27B so as to face the lower end surface of the ring magnet 23.

The first soft magnetic ring 26 and the second soft magnetic ring 27 are respectively formed by pressing. The first soft magnetic ring 26 and the second soft magnetic ring 27 are not limited to pressing, and may be formed by casting, sintering, and so on.

The first magnetic path tip end portions 26A and the second magnetic path tip end portions 27A are formed in a flat plate shape. The first magnetic path tip end portions 26A and the second magnetic path tip end portions 27A are disposed alternately at equal intervals in the circumferential direction about the rotary axis O of the torsion bar 21 on an identical plane that is orthogonal to the rotary axis O.

Further, the first magnetic path tip end portions 26A and the second magnetic path tip end portions 27A are disposed such that in a neutral condition where no torque acts on the torsion bar 21, center lines extending respectively in a radial direction of the torsion bar 21 denote boundaries between the N poles and the S poles of the ring magnet 23.

The first magnetic path column portions 26B and the second magnetic path column portions 27B are respectively formed in a flat plate shape so as to extend in the rotary axis O direction. The first magnetic path column portions 26B are disposed at predetermined intervals so as to surround an outer peripheral surface of the ring magnet 23. The first magnetic path column portions 26B are provided so as not to short-circuit the magnetic flux of the ring magnet 23. Further, the second magnetic path column portions 27B are provided to extend along the rotary axis O in an opposite direction to the first magnetic path column portions 26B.

The first magnetic path ring portion 26C and the second magnetic path ring portion 27C are disposed on an orthogonal plane to the rotary axis O and formed in a ring shape having a fully connected circumference. The first magnetic path ring portion 26C and the second magnetic path ring portion 27C are not limited to this shape, and may be formed in a C shape having a slit in a part thereof.

The first magnetic path ring portion 26C is disposed above the lower end surface of the ring magnet 23, and the second magnetic path ring portion 27C is disposed below the ring magnet 23. In other words, the ring magnet 23 is disposed between the first magnetic path ring portion 26C and the second magnetic path ring portion 27C in the rotary axis O direction.

As shown in FIGS. 1, 2, 4, 6, and 7, the fixed magnetic circuit portion 31 includes a first magnetic flux collecting ring 32 provided along an outer periphery of the first magnetic path ring portion 26C of the first soft magnetic ring 26, a second magnetic flux collecting ring 33 provided along an outer periphery of the second magnetic path ring portion 27C of the second soft magnetic ring 27, a first magnetic flux collecting yoke 34 connected to the first magnetic flux collecting ring 32, and a second magnetic flux collecting yoke 35 connected to the second magnetic flux collecting ring 33. It should be noted that the first magnetic flux collecting ring 32 and the second magnetic flux collecting ring 33 are partially omitted from FIG. 4.

The first magnetic flux collecting ring 32 and the second magnetic flux collecting ring 33 are formed in a C shape having a slit in a part thereof, and fixed to an inner peripheral surface of the housing 30 by caulking. An inner peripheral surface of the first magnetic flux collecting ring 32 faces the first magnetic path ring portion 26C of the first soft magnetic ring 26, and an inner peripheral surface of the second magnetic flux collecting ring 33 faces the second magnetic path ring portion 27C of the second soft magnetic ring 27.

Hence, the first magnetic flux collecting ring 32 and the second magnetic flux collecting ring 33 are disposed on an outer periphery of the rotating magnetic circuit portion 25 so as to guide magnetic flux to the magnetism sensor 48 side after reducing effects of rotation fluctuation and eccentricity in the rotating magnetic circuit portion 25.

The first magnetic flux collecting yoke 34 is formed in a block shape having an arc-shaped inner peripheral surface 34a that contacts an outer peripheral surface of the first magnetic flux collecting ring 32. The second magnetic flux collecting yoke 35 is formed in a block shape having an arc-shaped inner peripheral surface 35a that contacts an outer peripheral surface of the second magnetic flux collecting ring 33.

A pair of magnetic flux collecting projecting portions 34b are provided on the first magnetic flux collecting yoke 34 to extend in the rotary axis O direction, and a pair of magnetic flux collecting projecting portions 35b are provided on the second magnetic flux collecting yoke 35 to extend in the rotary axis O direction. The pair of magnetic flux collecting projecting portions 34b of the first magnetic flux collecting yoke 34 and the pair of magnetic flux collecting projecting portions 35b of the second magnetic flux collecting yoke 35 respectively oppose each other via predetermined gaps serving as magnetic gaps. In other words, a pair of magnetic gaps arranged in the circumferential direction is formed between the first magnetic flux collecting yoke 34 and the second magnetic flux collecting yoke 35. The magnetism sensor 48 is disposed in each magnetic gap.

The first magnetic flux collecting yoke 34 and the second magnetic flux collecting yoke 35 have a function for collecting magnetic flux from the rotating magnetic circuit portion 25 on the magnetism sensors 48 via the first magnetic flux collecting ring 32 and the second magnetic flux collecting ring 33.

The first magnetic flux collecting yoke 34, the second magnetic flux collecting yoke 35, the magnetism sensors 48, and a substrate 47 are fixed to a sensor holder 40 via mold resin. A cylindrical portion 40a of the resin sensor holder 40 is fitted into an opening portion 30a of the housing 30, and the sensor holder 40 is attached to the metal housing 30 via a bolt inserted into a fastening hole 40b thereof.

A Hall element is used as the magnetism sensor 48 for detecting magnetism. The Hall element outputs a voltage as a signal corresponding to a magnetic flux density passing through itself. The magnetism sensor 48 outputs a voltage corresponding to a magnitude and a direction of a magnetic field in the magnetic gap via the substrate 47 and a terminal 44. The terminal 44 is connected to a controller via a wire connected to the sensor holder 40. A circuit for amplifying the signal from the Hall element, a circuit for performing temperature compensation, a noise filter circuit, and so on may be included in the magnetism sensor 48.

The magnetism sensor 48 is provided in a pair in accordance with the pair of magnetic gaps formed between the first magnetic flux collecting yoke 34 and the second magnetic flux collecting yoke 35 and arranged in the circumferential direction. One of the magnetism sensors 48 forms a main system, and the other forms a sub-system. An output voltage output from the magnetism sensor 48 of the main system is used to control the electric motor of the electric power steering apparatus 1. An output voltage output from the magnetism sensor 48 of the sub-system is used by the controller to diagnose an abnormality in the torque sensor 100. More specifically, the controller compares steering torque detected in the main system with steering torque detected in the sub-system, and determines that an abnormality has occurred in the torque sensor 100 when a difference therebetween is determined to equal or exceed a predetermined allowable difference.

Next, a method of detecting the steering torque acting on the torsion bar 21 using the torque sensor 100 will be described.

In the neutral condition where no torque acts on the torsion bar 21, the first magnetic path tip end portions 26A of the first soft magnetic ring 26 and the second magnetic path tip end portions 27A of the second soft magnetic ring 27 respectively face the N poles and the S poles of the ring magnet 23 by an identical surface area so as to be magnetically short-circuited. As a result, no magnetic flux is guided to the rotating magnetic circuit portion 25 and the fixed magnetic circuit portion 31.

When torque in a specific direction is exerted on the torsion bar 21 in response to an operation of the steering wheel by a driver, the torsion bar 21 undergoes torsional deformation in accordance with the direction of the torque. When the torsion bar 21 undergoes torsional deformation, the first magnetic path tip end portions 26A face the N poles by a greater surface area than the S poles, while the second magnetic path tip end portions 27A face the S poles by a greater surface area than the N poles. Accordingly, the magnetic flux from the ring magnet 23 is guided to the fixed magnetic circuit portion 31 through the rotating magnetic circuit portion 25. More specifically, a resulting magnetic path extends from the N pole to the S pole via the first soft magnetic ring 26, the first magnetic flux collecting ring 32, the first magnetic flux collecting yoke 34, the second magnetic flux collecting yoke 35, the second magnetic flux collecting ring 33, and the second soft magnetic ring 27. The magnetism sensors 48 disposed in the magnetic gaps between the first magnetic flux collecting yoke 34 and the second magnetic flux collecting yoke 35 output signals corresponding to the magnitude and the direction of the magnetic flux.

When torque is exerted on the torsion bar 21 in an opposite direction to the above direction in response to an operation of the steering wheel by the driver, the torsion bar 21 undergoes torsional deformation in an opposite direction in accordance with the direction of the torque. When the torsion bar 21 undergoes torsional deformation, the first magnetic path tip end portions 26A face the S poles by a greater surface area than the N poles, while the second magnetic path tip end portions 27A face the N poles by a greater surface area than the S poles. Accordingly, the magnetic flux from the ring magnet 23 is guided to the fixed magnetic circuit portion 31 through the rotating magnetic circuit portion 25 along an opposite path to that described above. More specifically, the magnetic path extends from the N pole to the S pole via the second soft magnetic ring 27, the second magnetic flux collecting ring 33, the second magnetic flux collecting yoke 35, the first magnetic flux collecting yoke 34, the first magnetic flux collecting ring 32, and the first soft magnetic ring 26. The magnetism sensors 48 disposed in the magnetic gaps between the first magnetic flux collecting yoke 34 and the second magnetic flux collecting yoke 35 output signals corresponding to the magnitude and the direction of the magnetic flux.

The magnetic flux guided to the magnetic gaps increases as a surface area difference by which the first magnetic path tip end portions 26A face the N poles and the S poles of the ring magnet 23 and a surface area difference by which the second magnetic path tip end portions 27A face the N poles and the S poles of the ring magnet 23 increase, and as a result, the output signals from the magnetism sensors 48 also increase. Therefore, by increasing the number of magnetic poles on the ring magnet 23, the magnetic flux density guided to the magnetism sensors 48 can be increased.

Figure 23:
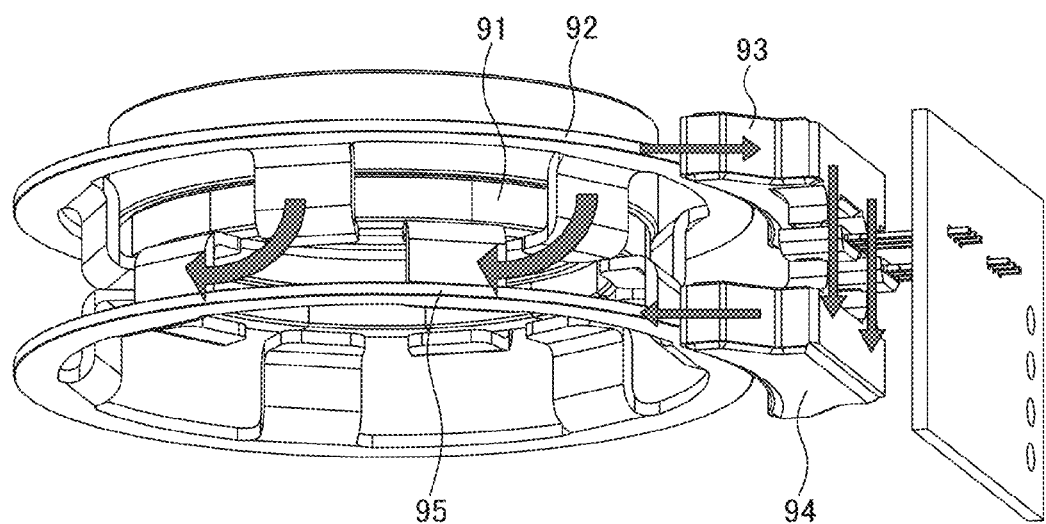
FIG. 23 is a view showing a normal magnetic flux path and a path of flux leakage, wherein straight line arrows show the normal magnetic flux path and curved line arrows show the path of the flux leakage.

Here, referring to FIGS. 8, 9, and 23, flux leakage in the rotating magnetic circuit portion 25 will be described.

Figure 8:
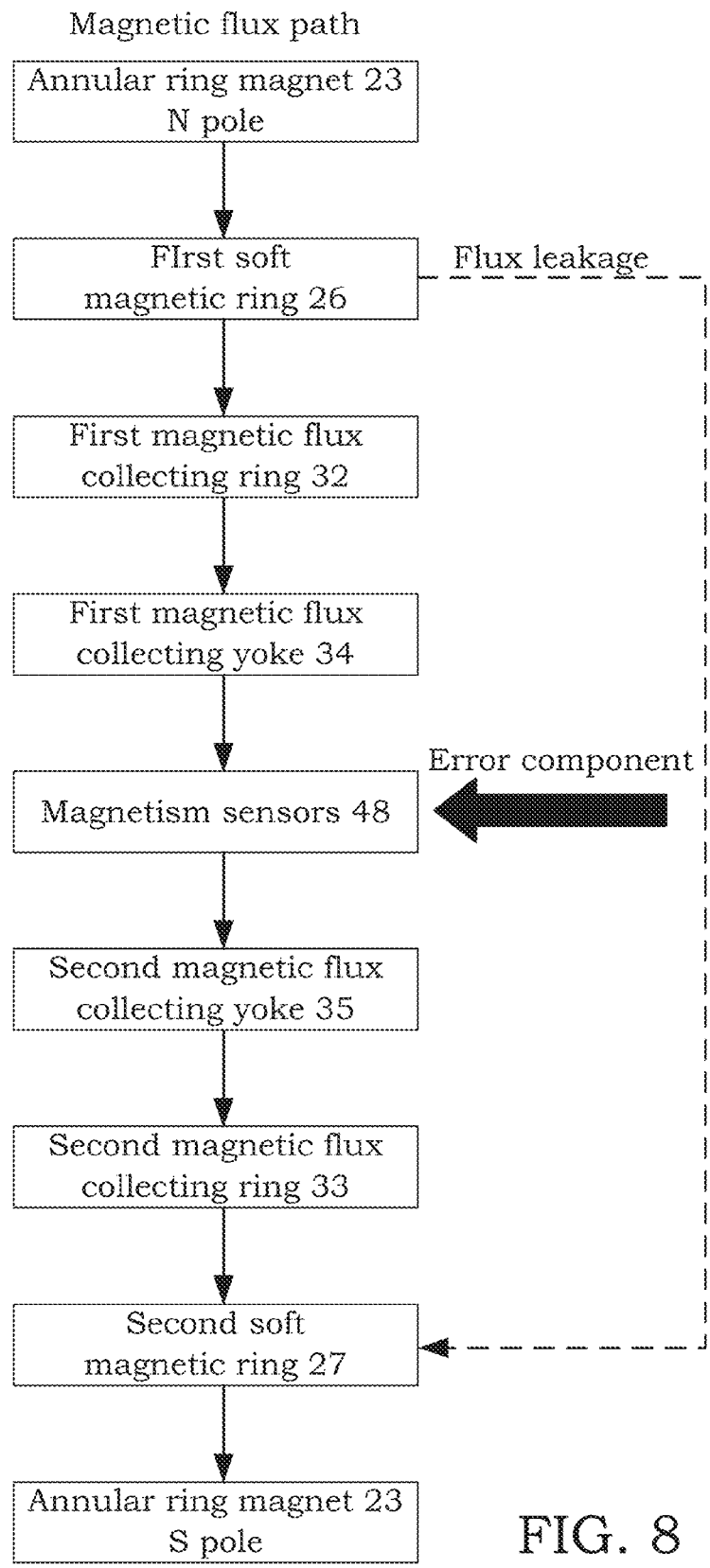
FIG. 8 is a view showing a magnetic flux path, wherein solid line arrows show a normal magnetic flux path and a dotted line arrow shows a path of flux leakage.

FIG. 8 is a view showing a magnetic flux path in a case where the torsion bar 21 undergoes torsional deformation such that the first magnetic path tip end portions 26A of the first soft magnetic ring 26 face the N poles by a larger surface area than the S poles and the second magnetic path tip end portions 27A of the second soft magnetic ring 27 face the S poles by a larger surface area than the N poles. Solid line arrows show a normal magnetic flux path, and a dotted line arrow shows a path of flux leakage.

The flux leakage is guided from the first soft magnetic ring 26 to the second soft magnetic ring 27 so as to bypass the magnetism sensors 48. Hence, a flux leakage path (the path indicated by curved line arrows in FIG. 23) that short-circuits the first soft magnetic ring 26 and the second soft magnetic ring 27 exists in the rotating magnetic circuit portion 25 separately to the normal magnetic flux path. The flux leakage path extends from the N pole of the ring magnet 23 toward the S pole through the first soft magnetic ring 26 and the second soft magnetic ring 27, and therefore exists in a number corresponding to the number of magnetic poles. In this embodiment, the ring magnet 23 includes six pairs of N and S poles, and therefore six magnetic flux paths that short-circuit the first soft magnetic ring 26 and the second soft magnetic ring 27 exist.

Figure 9:
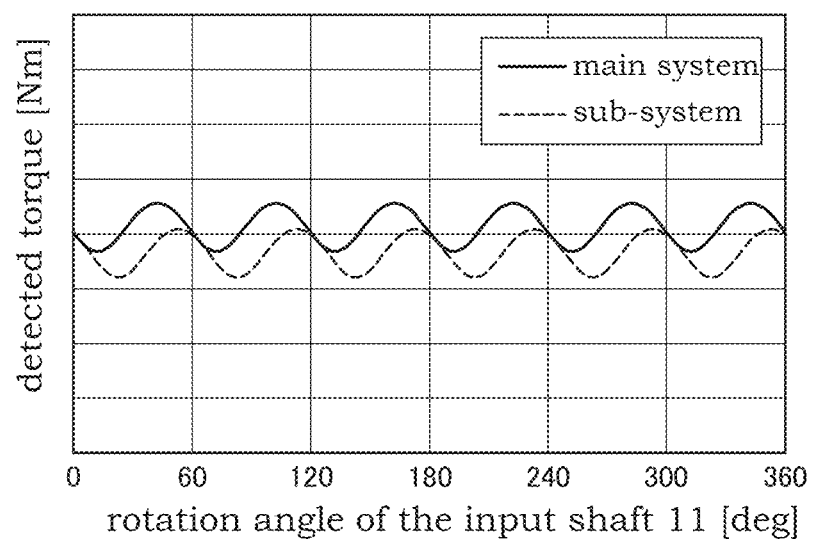
FIG. 9 is a graph showing a detection error in the torque sensor due to an effect of flux leakage.
Figure 10:
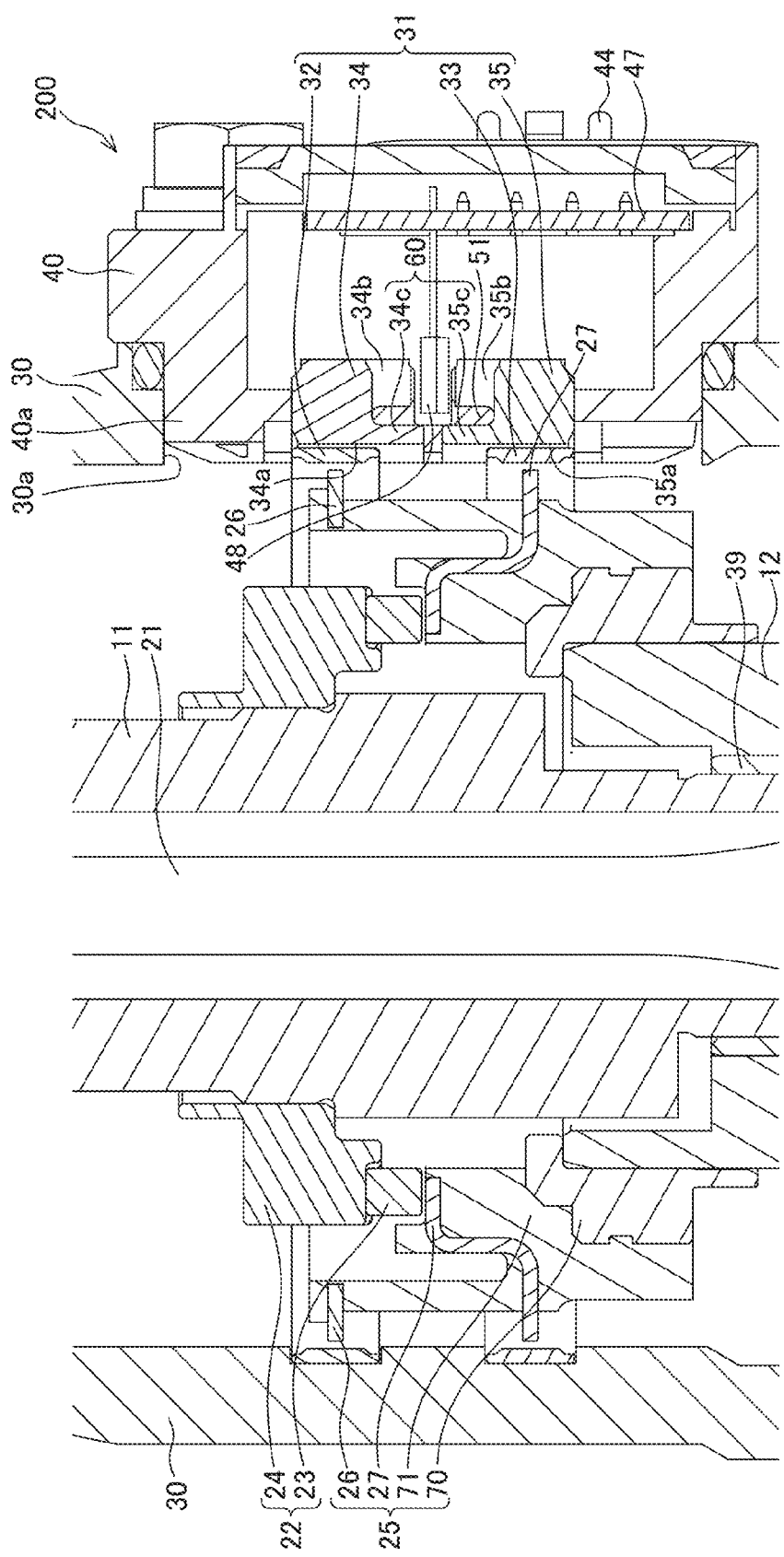
FIG. 10 is a partial longitudinal sectional view of an electric power steering apparatus to which a torque sensor according to a second embodiment of the present invention is applied.
Figure 11:
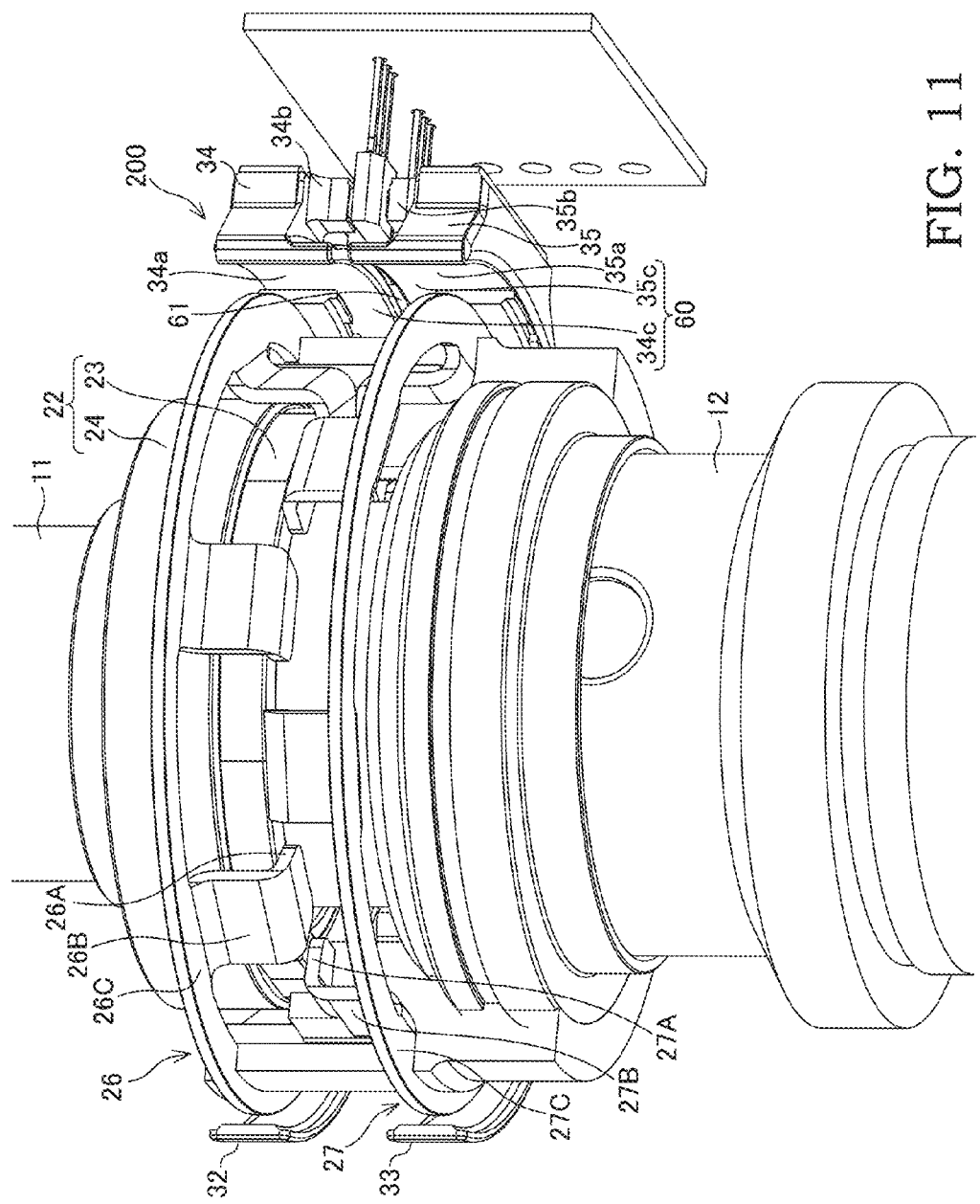
FIG. 11 is a perspective view of the torque sensor according to the second embodiment of the present invention in a condition where a housing has been removed.
Figure 12:
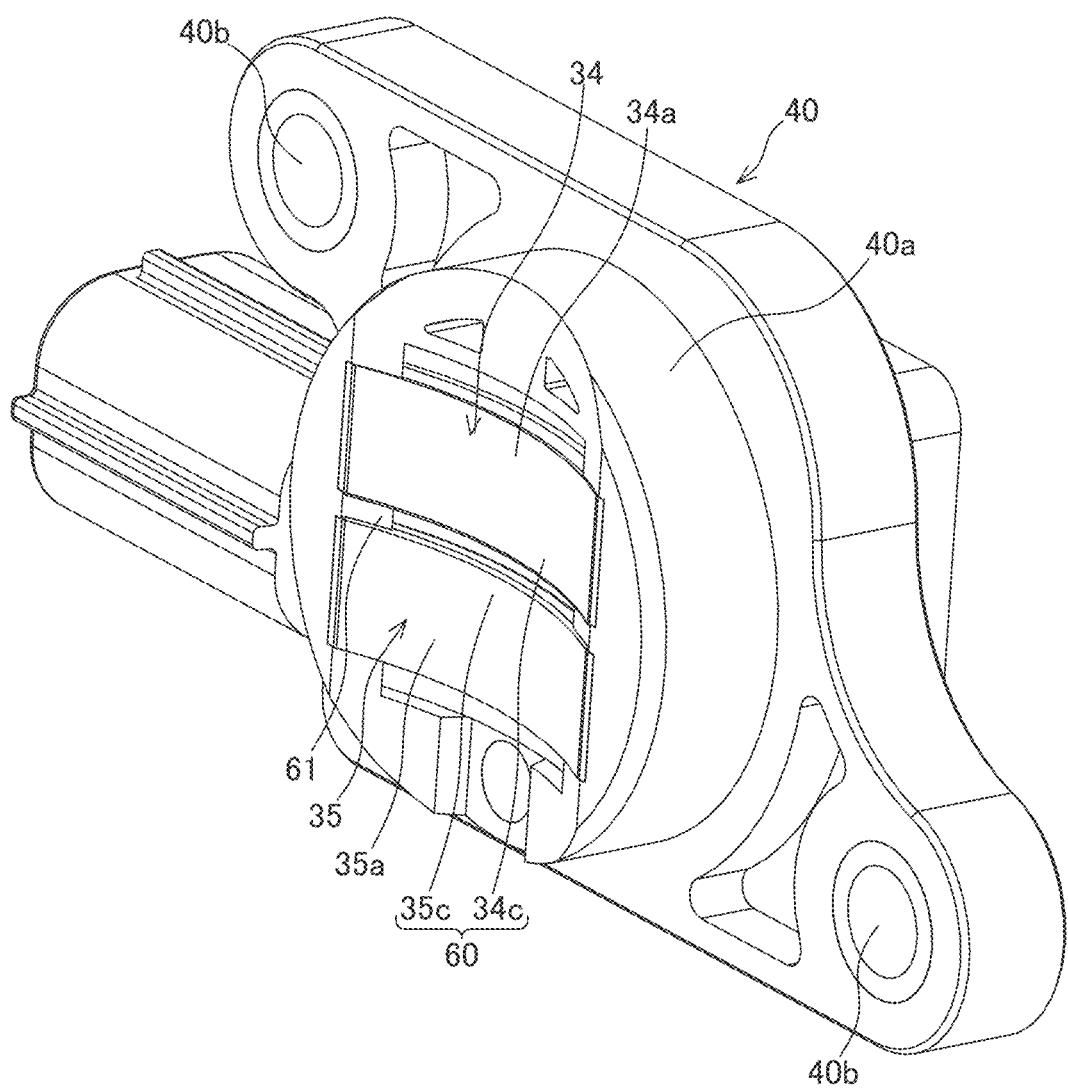
FIG. 12 is a perspective view of a sensor holder.
Figure 13:
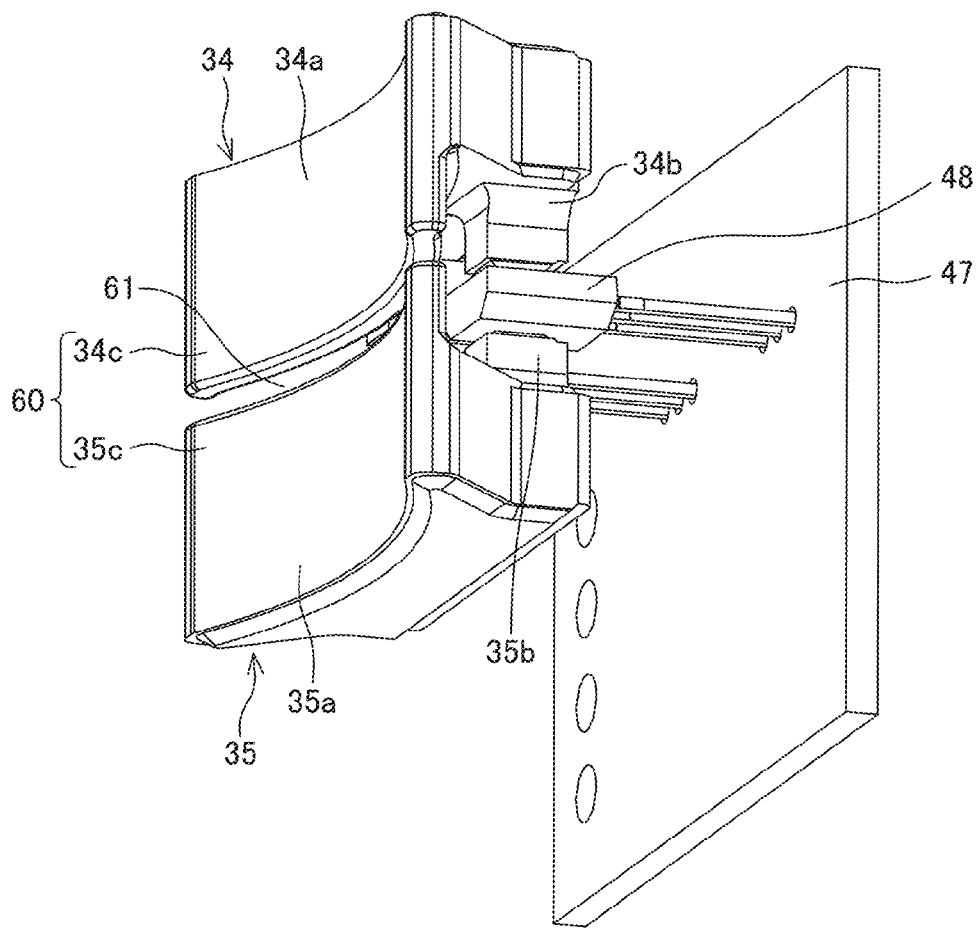
FIG. 13 is a perspective view of a magnetic flux collecting yoke.
Figure 14:
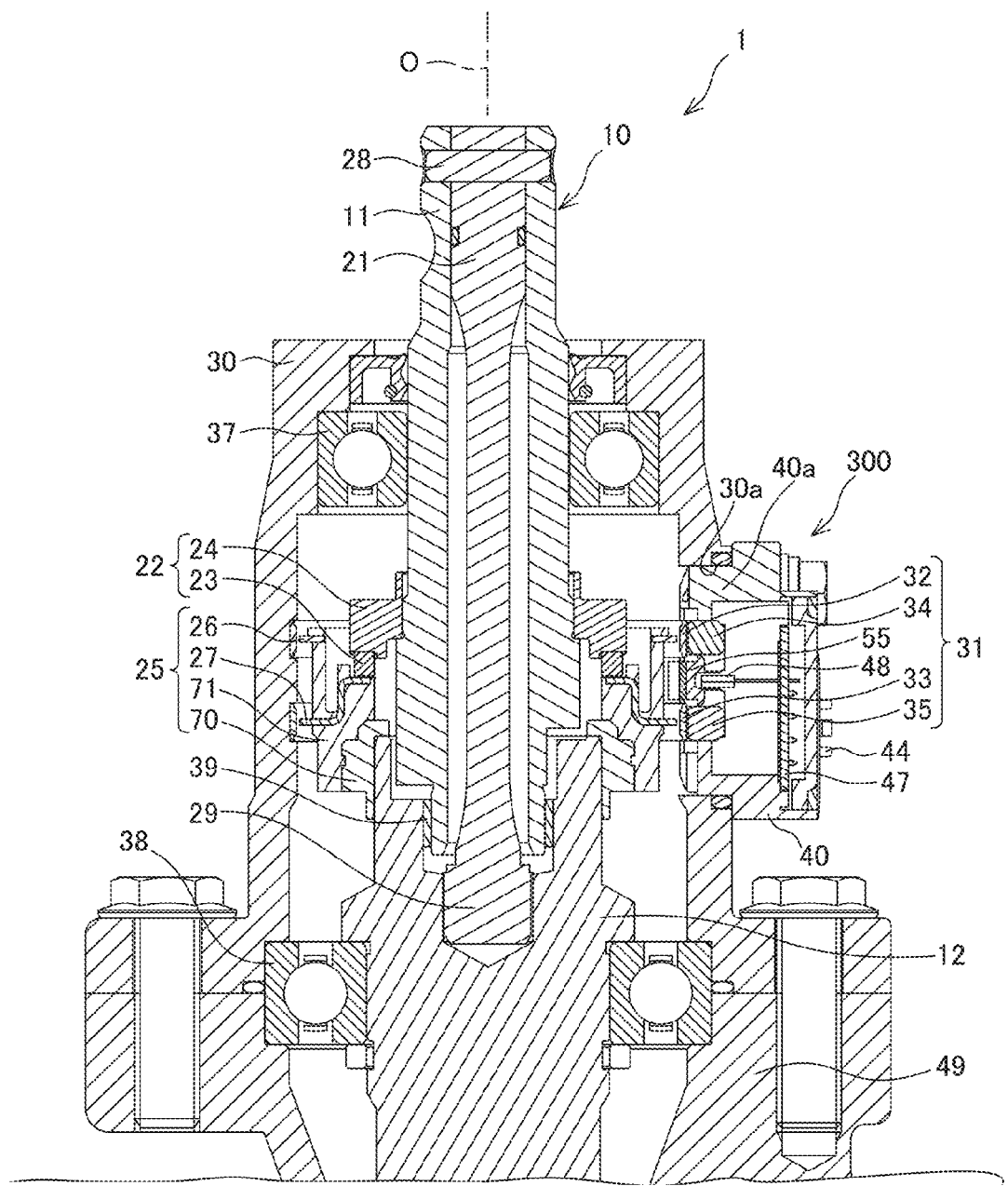
FIG. 14 is a longitudinal sectional view of an electric power steering apparatus to which a torque sensor according to a third embodiment of the present invention is applied.
Figure 15:
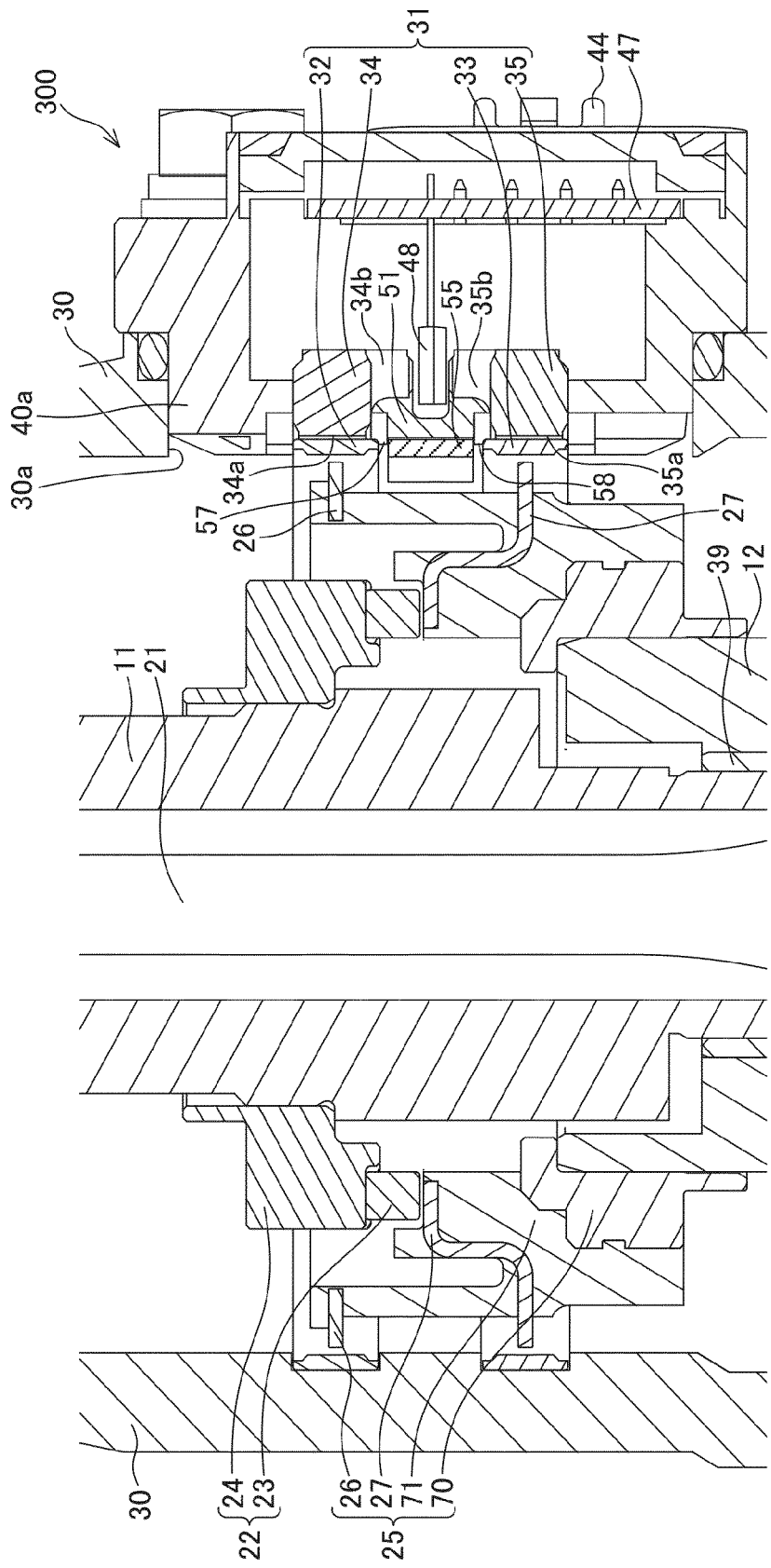
FIG. 15 is a partially enlarged view of FIG. 14.
Figure 16:
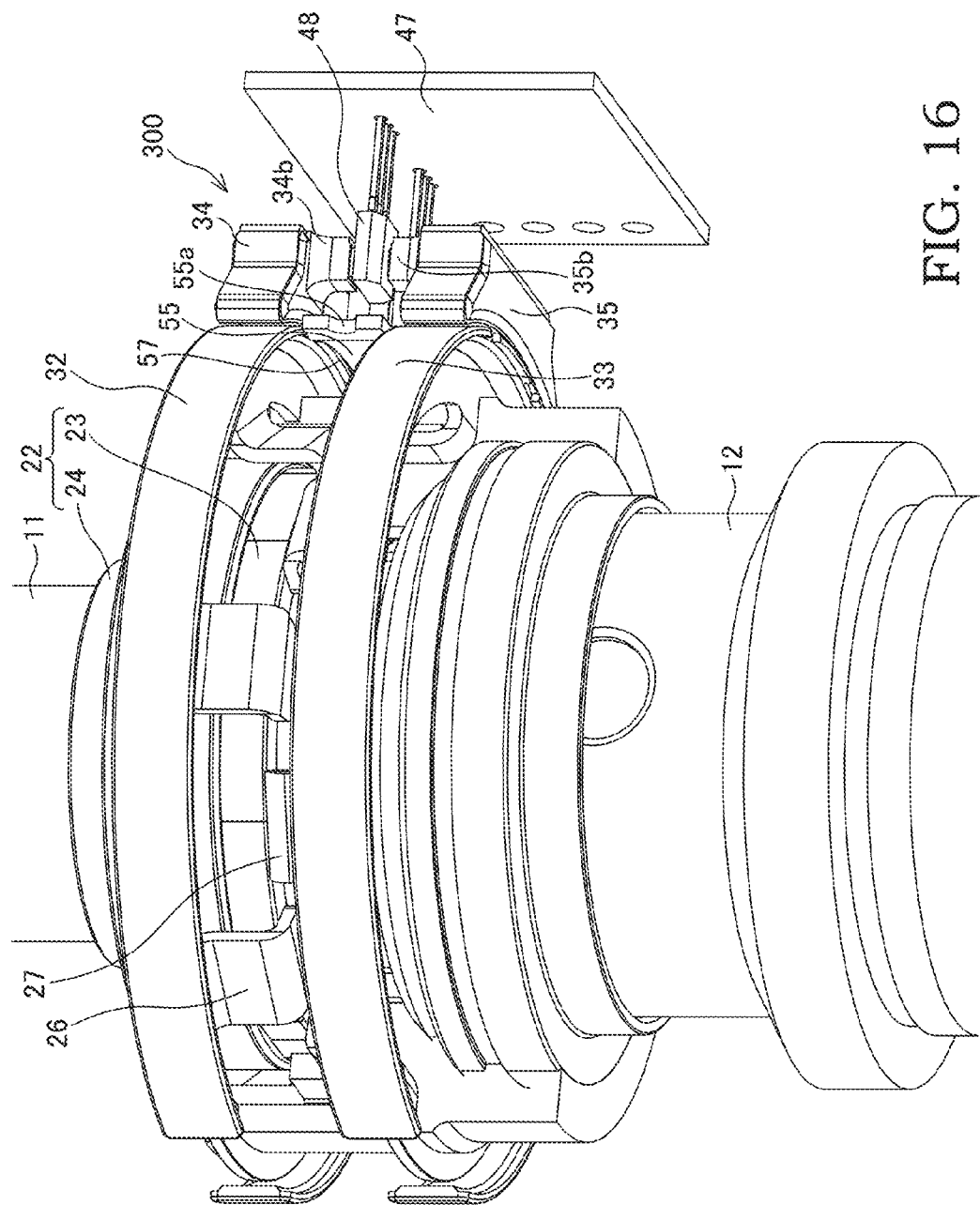
FIG. 16 is a perspective view of the torque sensor according to the third embodiment of the present invention in a condition where a housing has been removed.

FIG. 9 is a graph showing a detection error of the torque sensor 100 due to an effect of flux leakage. The abscissa in FIG. 9 shows a rotation angle of the input shaft 11, and the ordinate shows the steering torque (detected torque) detected by the torque sensor 100. Further, a solid line in FIG. 9 shows the detected torque of the main system, and a dotted line shows the detected torque of the sub-system.

FIG. 9 shows the detected torque of the torque sensor 100 in a case where the input shaft 11 is rotated by a single revolution such that the steering torque acting on the torsion bar 21 remains constant. Since the steering torque acting on the torsion bar 21 is constant, the detected torque of the torque sensor 100 should also be constant. As shown in FIG. 9, however, the detected torque of the torque sensor 100 varies in 60° periods. The reason for this is that the six flux leakage paths short-circuiting the first soft magnetic ring 26 and the second soft magnetic ring 27 exist, as described above, and these six flux leakages are detected as density variation accompanying rotation of the input shaft 11. Hence, the torque sensor 100 also detects variation in the flux leakage that is dependent on the rotation angle of the input shaft 11, or in other words variation in the flux leakage that is not related to the torsional deformation of the torsion bar 21.

When the magnetism sensors 48 pick up the flux leakage variation (an error component) that is not related to the torsional deformation of the torsion bar 21, the magnetism sensors 48 detect a magnetic flux density in which the flux leakage variation that is not related to the torsional deformation of the torsion bar 21 is superimposed on a true magnetic flux density accompanying torsional deformation of the torsion bar 21, and as a result, a detection error is generated in the torque sensor 100. When a detection error is generated in the torque sensor 100, an error occurs in the auxiliary steering torque applied to the output shaft 12 by the electric motor. Therefore, in a case where highly precise control is required of the electric power steering apparatus 1, it is necessary to prevent a detection error from occurring in the torque sensor 100 due to flux leakage variation that is not related to the torsional deformation of the torsion bar 21.

For this purpose, as shown in FIGS. 2, 4, 6, and 7, a shield 50 that guides the flux leakage between the first magnetic flux collecting yoke 34 and the second magnetic flux collecting yoke 35 while magnetically shielding the magnetism sensors 48 from the flux leakage is disposed between the rotating magnetic circuit portion 25 and the magnetism sensors 48.

The shield 50 takes an arc shape having a substantially identical curvature radius to the inner peripheral surfaces 34a, 35a of the first magnetic flux collecting yoke 34 and the second magnetic flux collecting yoke 35, and is formed from a magnetic material, or more specifically a soft magnetic material.

The shield 50 is molded integrally with the sensor holder 40 (see FIG. 6) via the mold resin together with the first magnetic flux collecting yoke 34 and the second magnetic flux collecting yoke 35. More specifically, the shield 50 is fixed to mold resin 51 (see FIG. 2). The mold resin 51 is formed between the first magnetic flux collecting yoke 34 and the second magnetic flux collecting yoke 35 and supports the two yokes 34, 35. The shield 50 and the mold resin 51 are molded integrally by insert molding or outsert molding.

The shield 50 is disposed such that an inner peripheral surface 50a thereof is coplanar with the inner peripheral surfaces 34a, 35a, and disposed between the first magnetic flux collecting yoke 34 and the second magnetic flux collecting yoke 35 via respective predetermined gaps 52, 53.

By disposing the shield 50 between the first magnetic flux collecting yoke 34 and the second magnetic flux collecting yoke 35, the flux leakage in the rotating magnetic circuit portion 25 is guided by the shield 50 so as not to reach the magnetism sensors 48. Hence, the magnetism sensors 48 are magnetically shielded from the flux leakage in the rotating magnetic circuit portion 25 by the shield 50, and are not therefore affected by flux leakage variation not related to the torsional deformation of the torsion bar 21. Accordingly, a detection error does not occur in the torque sensor 100, and as a result, the detection precision of the torque sensor 100 improves.

When the gap 52 between the shield 50 and the first magnetic flux collecting yoke 34 and the gap 53 between the shield 50 and the second magnetic flux collecting yoke 35 are too small, the first magnetic flux collecting yoke 34 and the second magnetic flux collecting yoke 35 are short-circuited via the shield 50, leading to a reduction in the magnetic flux density detected by the magnetism sensors 48. The gaps 52, 53 are therefore set at dimensions at which the magnetism sensors 48 can be magnetically shielded from the flux leakage in the rotating magnetic circuit portion 25 while suppressing a reduction in the magnetic flux density detected by the magnetism sensors 48.

According to the first embodiment, described above, following effects are obtained.

By providing the shield 50 between the first magnetic flux collecting yoke 34 and the second magnetic flux collecting yoke 35, the flux leakage in the rotating magnetic circuit portion 25 is guided by the shield 50 so as to be guided from the first magnetic flux collecting yoke 34 to the second magnetic flux collecting yoke 35 or from the second magnetic flux collecting yoke 35 to the first magnetic flux collecting yoke 34 while bypassing the magnetism sensors 48. Hence, the flux leakage in the rotating magnetic circuit portion 25 does not reach the magnetism sensors 48, and therefore the magnetism sensors 48 are not affected by flux leakage variation not related to the torsional deformation of the torsion bar 21. Accordingly, a detection error caused by the flux leakage in the rotating magnetic circuit portion 25 does not occur in the torque sensor 100, and as a result, the detection precision of the torque sensor 100 improves.

By providing the shield 50, a detection error caused by the flux leakage in the rotating magnetic circuit portion 25 does not occur in the torque sensor 100, and therefore the magnetism sensors 48 can be disposed closer to the input and output shafts 11, 12, enabling a reduction in the size of the torque sensor 100.

[Second Embodiment]

Next, referring to FIGS. 10 to 13, a torque sensor 200 according to a second embodiment of the present invention will be described. Only differences with the first embodiment will be described below, while identical configurations to the first embodiment have been allocated identical reference symbols and description thereof has been omitted.

The torque sensor 200 differs from the first embodiment in the configuration of a shield 60 that guides flux leakage between the first magnetic flux collecting yoke 34 and the second magnetic flux collecting yoke 35. In the first embodiment, the shield 50 is formed separately to the first magnetic flux collecting yoke 34 and the second magnetic flux collecting yoke 35, whereas the shield 60 of the torque sensor 200 is formed integrally with the first magnetic flux collecting yoke 34 and the second magnetic flux collecting yoke 35. The shield 60 will be described in detail below.

The first magnetic flux collecting yoke 34 and the second magnetic flux collecting yoke 35 respectively include a first extension portion 34c and a second extension portion 35c formed by extending respective parts thereof. The first extension portion 34c and the second extension portion 35c are formed to extend in a mutually approaching direction, and disposed so as to face each other via a predetermined gap 61.

The shield 60 is constituted by the first extension portion 34c and the second extension portion 35c disposed to face each other via the predetermined gap 61, and is disposed between the rotating magnetic circuit portion 25 and the magnetism sensors 48. The shield 60 has a similar function to the shield 50 according to the first embodiment. In other words, the shield 60 guides the flux leakage between the first magnetic flux collecting yoke 34 and the second magnetic flux collecting yoke 35 while magnetically shielding the magnetism sensors 48 from the flux leakage.

Similarly to the first embodiment, the gap 61 between the first extension portion 34c and the second extension portion 35c is set at a dimension at which the magnetism sensors 48 can be magnetically shielded from the flux leakage in the rotating magnetic circuit portion 25 while suppressing a reduction in the magnetic flux density detected by the magnetism sensors 48.

According to the second embodiment, described above, following effects are obtained.

By providing the shield 60 that is formed integrally with the first magnetic flux collecting yoke 34 and the second magnetic flux collecting yoke 35, the flux leakage in the rotating magnetic circuit portion 25 is guided by the shield 60 so as to be guided from the first magnetic flux collecting yoke 34 to the second magnetic flux collecting yoke 35 or from the second magnetic flux collecting yoke 35 to the first magnetic flux collecting yoke 34 while bypassing the magnetism sensors 48. Hence, the flux leakage in the rotating magnetic circuit portion 25 does not reach the magnetism sensors 48, and therefore the magnetism sensors 48 are not affected by flux leakage variation not related to the torsional deformation of the torsion bar 21. Accordingly, a detection error caused by the flux leakage in the rotating magnetic circuit portion 25 does not occur in the torque sensor 200, and as a result, the detection precision of the torque sensor 200 improves.

Further, by providing the shield 60, a detection error caused by the flux leakage in the rotating magnetic circuit portion 25 does not occur in the torque sensor 200, and therefore the magnetism sensors 48 can be disposed closer to the input and output shafts 11, 12, enabling a reduction in the size of the torque sensor 200.

Moreover, the shield 60 is constituted by the first extension portion 34c and the second extension portion 35c formed by partially extending the first magnetic flux collecting yoke 34 and the second magnetic flux collecting yoke 35, and therefore a number of components can be reduced in comparison with the torque sensor 100 according to the first embodiment, in which the shield 50 is provided separately to the first magnetic flux collecting yoke 34 and the second magnetic flux collecting yoke 35.

[Third Embodiment]

Next, referring to FIGS. 14 to 18, a torque sensor 300 according to a third embodiment of the present invention will be described. Only differences with the first embodiment will be described below, while identical configurations to the first embodiment have been allocated identical reference symbols and description thereof has been omitted.

A shield 55 that guides the flux leakage between the first magnetic flux collecting ring 32 and the second magnetic flux collecting ring 33 while magnetically shielding the magnetism sensors 48 from the flux leakage is disposed between the rotating magnetic circuit portion 25 and the magnetism sensors 48.

The shield 55 is formed in an arc shape having a substantially identical curvature radius to the first magnetic flux collecting ring 32 and the second magnetic flux collecting ring 33, and has a substantially identical thickness to the first magnetic flux collecting ring 32 and the second magnetic flux collecting ring 33. The shield 55 is formed from a magnetic material, or more specifically a soft magnetic material.

Figure 17:
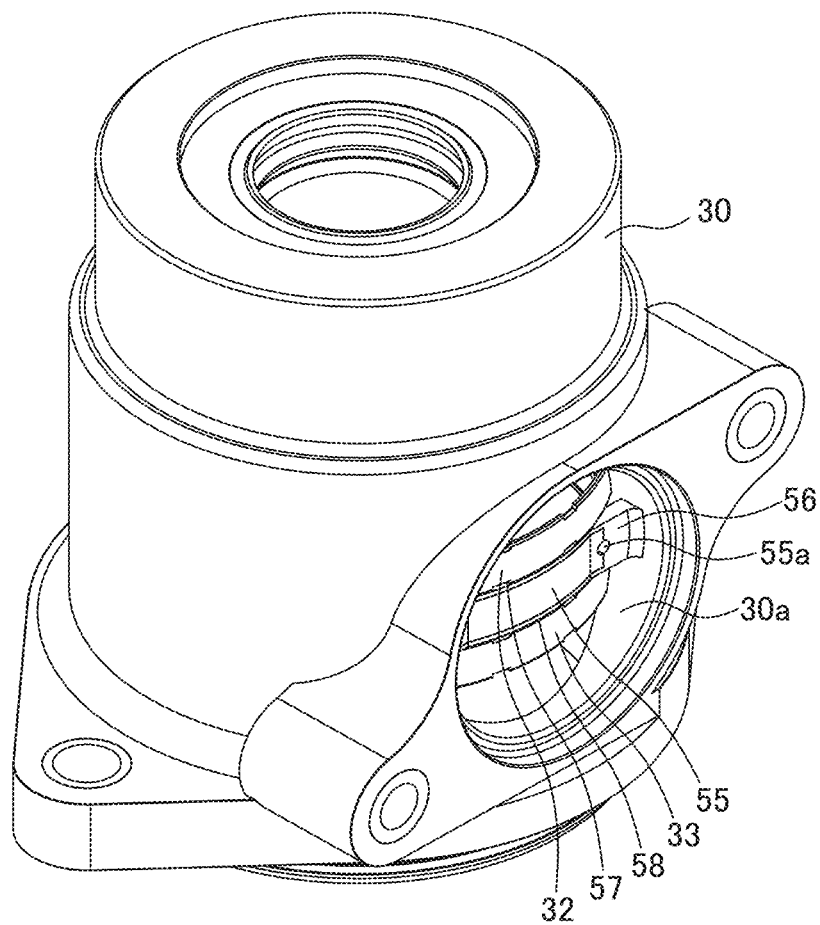
FIG. 17 is a perspective view of the housing.
Figure 18:
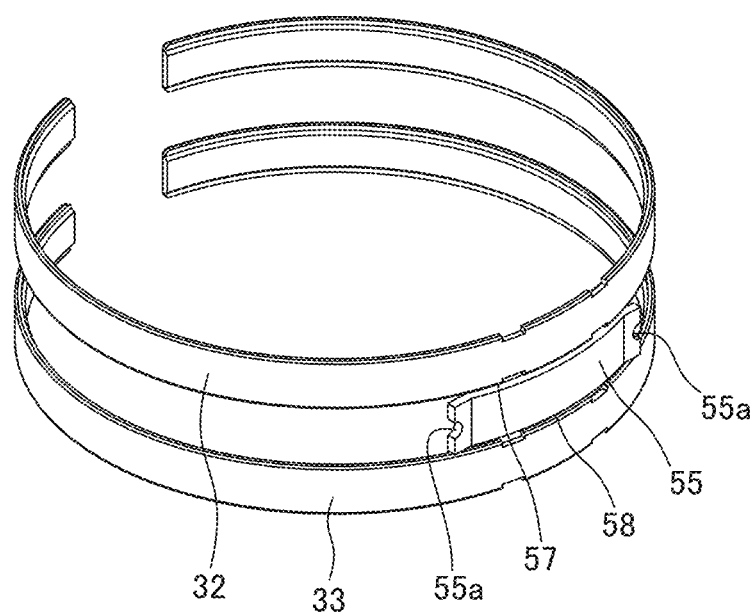
FIG. 18 is a perspective view of a magnetic flux collecting ring.
Figure 19:
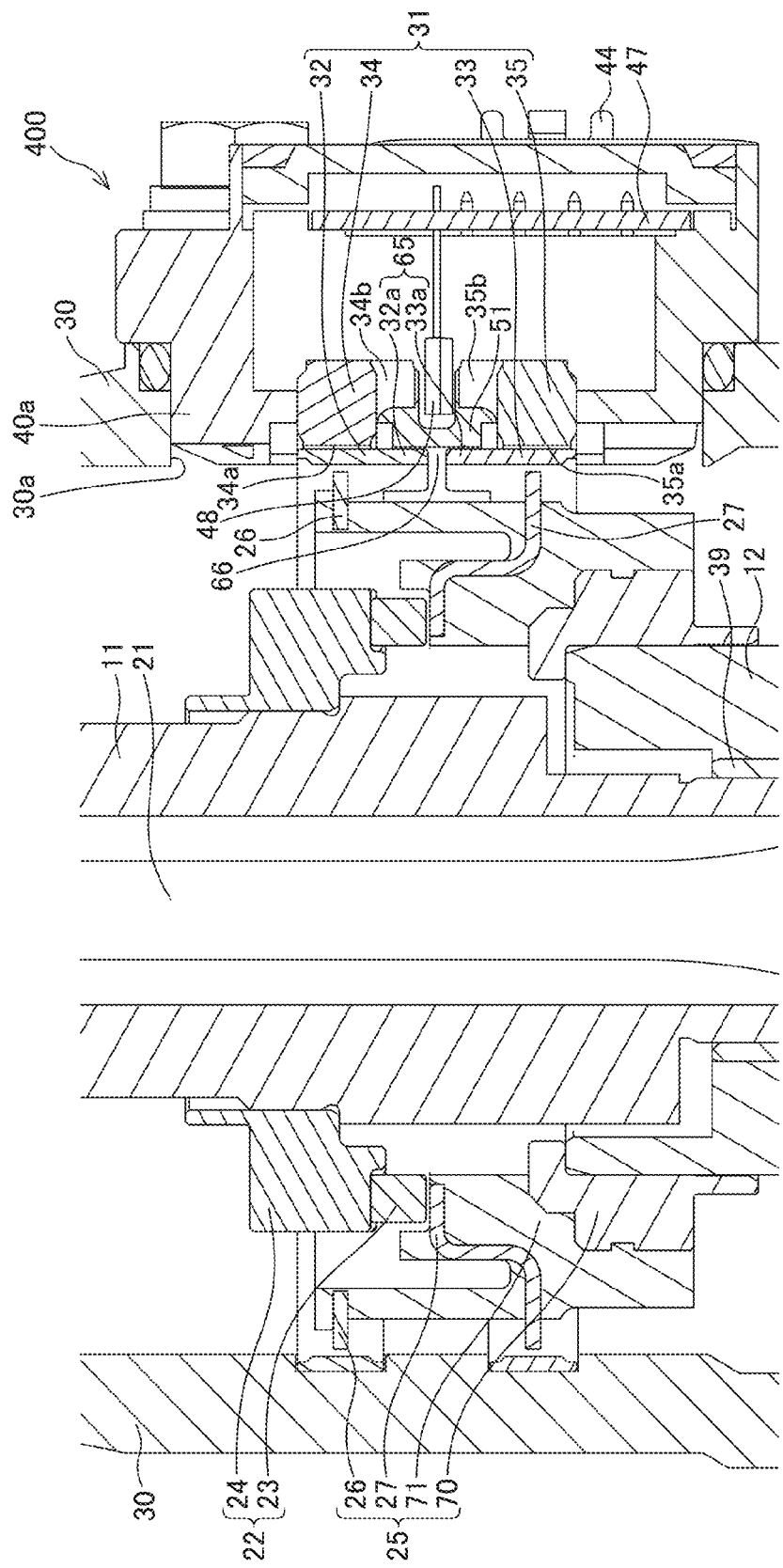
FIG. 19 is a partial longitudinal sectional view of an electric power steering apparatus to which a torque sensor according to a fourth embodiment of the present invention is applied.
Figure 20:
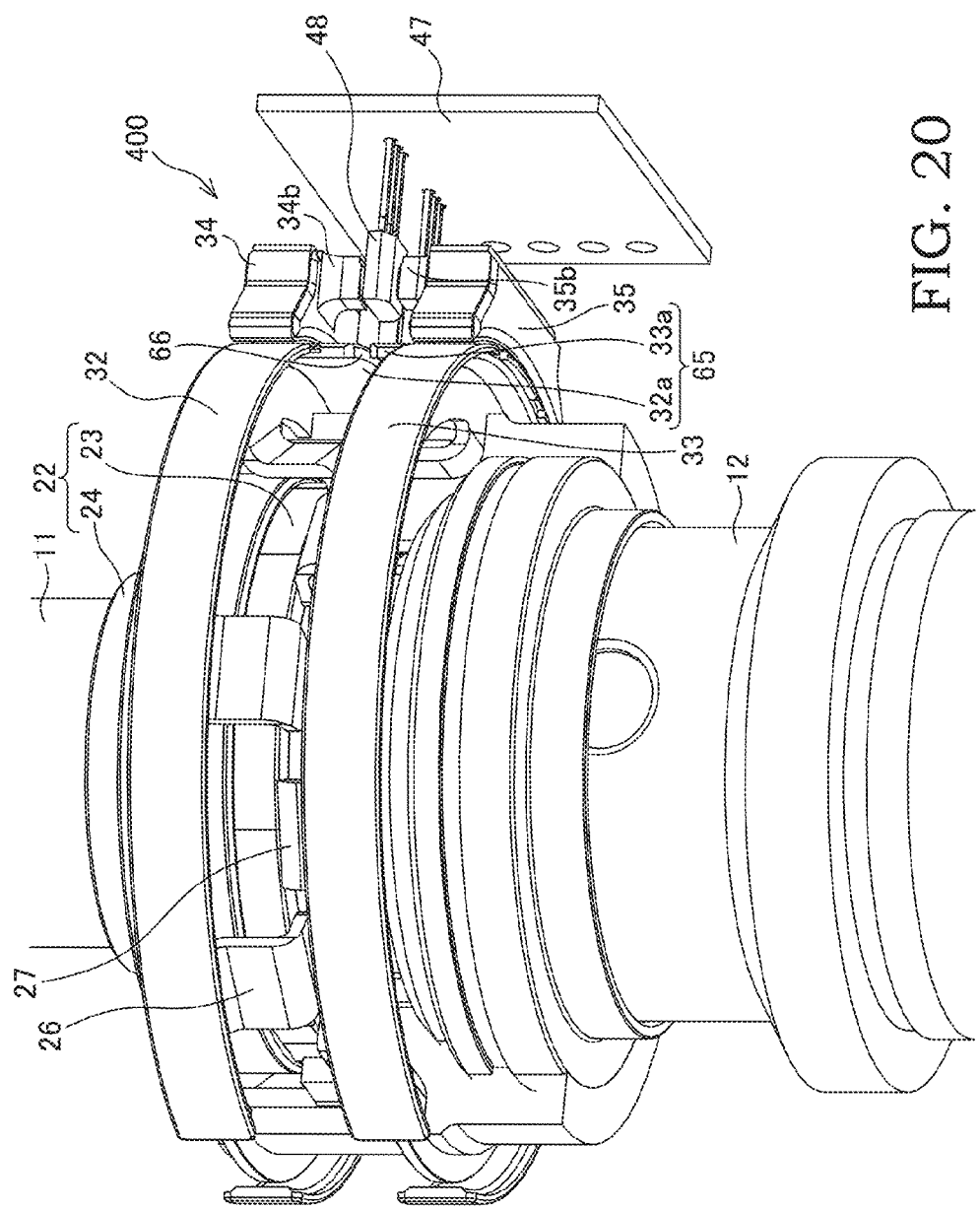
FIG. 20 is a perspective view of the torque sensor according to the fourth embodiment of the present invention in a condition where a housing has been removed.
Figure 21:
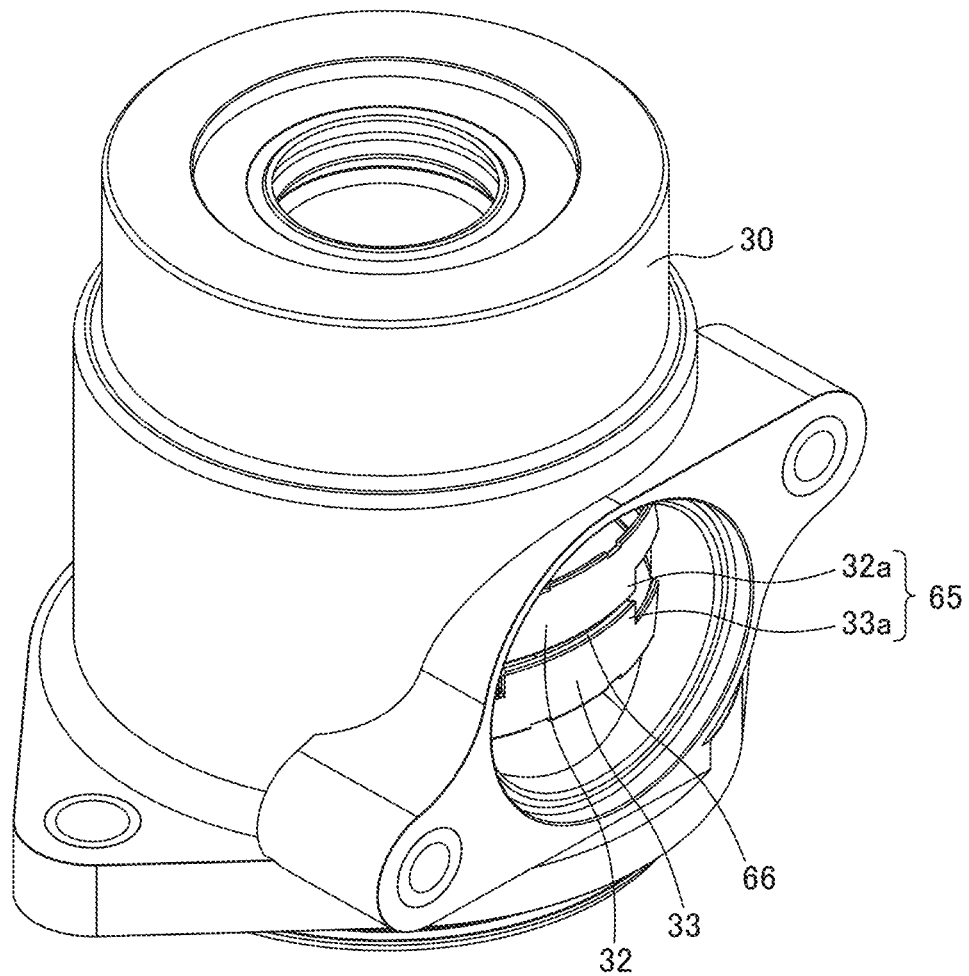
FIG. 21 is a perspective view of the housing.
Figure 22:
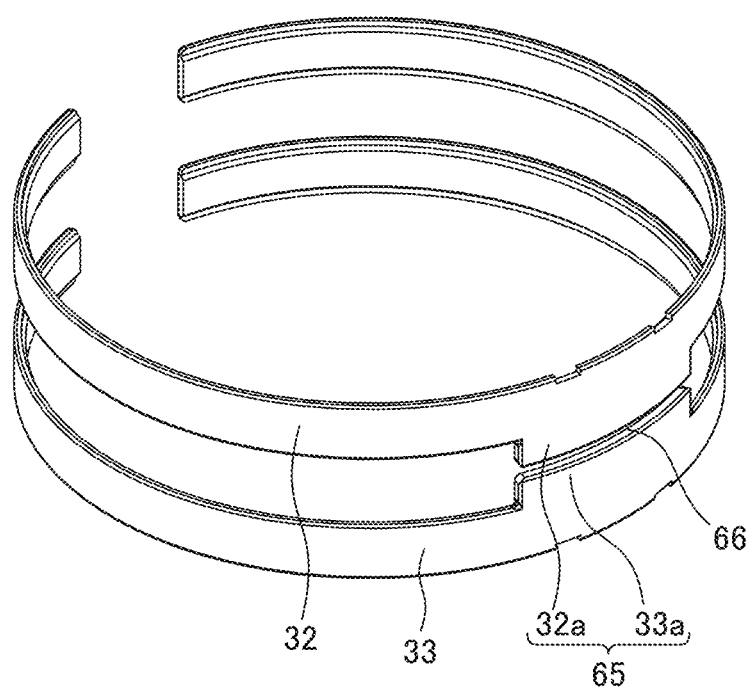
FIG. 22 is a perspective view of a magnetic flux collecting ring.

The shield 55 is molded integrally with the housing 30. More specifically, as shown in FIG. 17, the shield 55 is fixed to a resin material 56. The resin material 56 is joined to an inner peripheral surface of the opening portion 30a of the housing 30, and formed to traverse the opening portion 30a. The shield 55 and the resin material 56 are molded integrally by insert molding or outsert molding. Notches 55a for inserting pins used to position the shield 55 during integral molding of the shield 55 and the resin material 56 are formed in respective end portions of the shield 55.

Instead of molding the shield 55 and the housing 30 integrally, the shield 55 may be molded integrally with the sensor holder 40. In this case, the shield 55 is fixed to the mold resin 51 (see FIG. 2) that is formed between the first magnetic flux collecting yoke 34 and the second magnetic flux collecting yoke 35 and that supports the two yokes 34, 35.

The shield 55 is disposed between the first magnetic flux collecting ring 32 and the second magnetic flux collecting ring 33 via respective predetermined gaps 57, 58.

By disposing the shield 55 between the first magnetic flux collecting ring 32 and the second magnetic flux collecting ring 33, the flux leakage in the rotating magnetic circuit portion 25 is guided by the shield 55 so as not to reach the magnetism sensors 48. Hence, the magnetism sensors 48 are magnetically shielded from the flux leakage in the rotating magnetic circuit portion 25 by the shield 55, and are not therefore affected by flux leakage variation not related to the torsional deformation of the torsion bar 21. Accordingly, a detection error does not occur in the torque sensor 300, and as a result, the detection precision of the torque sensor 300 improves.

When the gap 57 between the shield 55 and the first magnetic flux collecting ring 32 and the gap 58 between the shield 55 and the second magnetic flux collecting ring 33 are too small, the first magnetic flux collecting ring 32 and the second magnetic flux collecting ring 33 are short-circuited via the shield 55, leading to a reduction in the magnetic flux density detected by the magnetism sensors 48. The gaps 57, 58 are therefore set at dimensions at which the magnetism sensors 48 can be magnetically shielded from the flux leakage in the rotating magnetic circuit portion 25 while suppressing a reduction in the magnetic flux density detected by the magnetism sensors 48.

According to the third embodiment, described above, following effects are obtained.

By providing the shield 55 between the first magnetic flux collecting ring 32 and the second magnetic flux collecting ring 33, the flux leakage in the rotating magnetic circuit portion 25 is guided by the shield 55 so as to be guided from the first magnetic flux collecting ring 32 to the second magnetic flux collecting ring 33 or from the second magnetic flux collecting ring 33 to the first magnetic flux collecting ring 32 while bypassing the magnetism sensors 48. Hence, the flux leakage in the rotating magnetic circuit portion 25 does not reach the magnetism sensors 48, and therefore the magnetism sensors 48 are not affected by flux leakage variation not related to the torsional deformation of the torsion bar 21. Accordingly, a detection error caused by the flux leakage in the rotating magnetic circuit portion 25 does not occur in the torque sensor 300, and as a result, the detection precision of the torque sensor 300 improves.

By providing the shield 55, a detection error caused by the flux leakage in the rotating magnetic circuit portion 25 does not occur in the torque sensor 300, and therefore the magnetism sensors 48 can be disposed closer to the input and output shafts 11, 12, enabling a reduction in the size of the torque sensor 300.

[Fourth Embodiment]

Next, referring to FIGS. 19 to 22, a torque sensor 400 according to a fourth embodiment of the present invention will be described. Only differences with the third embodiment will be described below, while identical configurations to the third embodiment have been allocated identical reference symbols and description thereof has been omitted.

The torque sensor 400 differs from the third embodiment in the configuration of a shield 65 that guides flux leakage between the first magnetic flux collecting ring 32 and the second magnetic flux collecting ring 33. In the third embodiment, the shield 55 is formed separately to the first magnetic flux collecting ring 32 and the second magnetic flux collecting ring 33, whereas the shield 65 of the torque sensor 400 is formed integrally with the first magnetic flux collecting ring 32 and the second magnetic flux collecting ring 33. The shield 65 will be described in detail below.

The first magnetic flux collecting ring 32 and the second magnetic flux collecting ring 33 respectively include a first extension portion 32a and a second extension portion 33a formed by extending respective parts thereof. The first extension portion 32a and the second extension portion 33a are formed to extend in a mutually approaching direction, and disposed so as to face each other via a predetermined gap 66.

The shield 65 is constituted by the first extension portion 32a and the second extension portion 33a disposed to face each other via the predetermined gap 66, and is disposed between the rotating magnetic circuit portion 25 and the magnetism sensor 48. The shield 65 has a similar function to the shield 55 according to the third embodiment. In other words, the shield 65 guides the flux leakage between the first magnetic flux collecting ring 32 and the second magnetic flux collecting ring 33 while magnetically shielding the magnetism sensors 48 from the flux leakage.

Similarly to the third embodiment, the gap 66 between the first extension portion 32a and the second extension portion 33a is set at a dimension at which the magnetism sensors 48 can be magnetically shielded from the flux leakage in the rotating magnetic circuit portion 25 while suppressing a reduction in the magnetic flux density detected by the magnetism sensors 48.

According to the fourth embodiment, described above, following effects are obtained.

By providing the shield 65 that is formed integrally with the first magnetic flux collecting ring 32 and the second magnetic flux collecting ring 33, the flux leakage in the rotating magnetic circuit portion 25 is guided by the shield 65 so as to be guided from the first magnetic flux collecting ring 32 to the second magnetic flux collecting ring 33 or from the second magnetic flux collecting ring 33 to the first magnetic flux collecting ring 32 while bypassing the magnetism sensors 48. Hence, the flux leakage in the rotating magnetic circuit portion 25 does not reach the magnetism sensors 48, and therefore the magnetism sensors 48 are not affected by flux leakage variation not related to the torsional deformation of the torsion bar 21. Accordingly, a detection error caused by the flux leakage in the rotating magnetic circuit portion 25 does not occur in the torque sensor 400, and as a result, the detection precision of the torque sensor 400 improves.

Further, by providing the shield 65, a detection error caused by the flux leakage in the rotating magnetic circuit portion 25 does not occur in the torque sensor 400, and therefore the magnetism sensors 48 can be disposed closer to the input and output shafts 11, 12, enabling a reduction in the size of the torque sensor 400.

Moreover, the shield 65 is constituted by the first extension portion 32a and the second extension portion 33a formed by partially extending the first magnetic flux collecting ring 32 and the second magnetic flux collecting ring 33, and therefore the number of components can be reduced in comparison with the torque sensor 300 according to the third embodiment, in which the shield 55 is provided separately to the first magnetic flux collecting ring 32 and the second magnetic flux collecting ring 33.

Embodiments of this invention were described above, but the above embodiments are merely examples of applications of this invention, and the technical scope of this invention is not limited to the specific constitutions of the above embodiments.

This application claims priority based on Japanese Patent Application No. 2012-65755 filed with the Japan Patent Office on Mar. 22, 2012 and Japanese Patent Application No. 2012-65765 filed with the Japan Patent Office on Mar. 22, 2012, the entire contents of which are incorporated into this specification.

INDUSTRIAL APPLICABILITY

The present invention can be used as a torque sensor employed in an electric power steering apparatus that assists a steering force applied by a driver to a steering wheel.

The invention claimed is:

1. A torque sensor that detects torque acting on a torsion bar that connects a first shaft and a second shaft, which are supported in a housing to be free to rotate, comprising:
   a magnetism generation portion that rotates together with the first shaft;
   a rotating magnetic circuit portion that rotates together with the second shaft;
   a fixed magnetic circuit portion fixed to the housing;
   a magnetism detector that detects a magnetic flux density guided from the magnetism generation portion to the fixed magnetic circuit portion through the rotating magnetic circuit portion in accordance with torsional deformation of the torsion bar; and
   a shield disposed between the rotating magnetic circuit portion and the magnetism detector, the shield being configured to shield the magnetism detector magnetically,
   wherein
   the rotating magnetic circuit portion comprises a first soft magnetic ring and a second soft magnetic ring to which magnetic flux generated by the magnetism generation portion is guided in accordance with the torsional deformation of the torsion bar,
   the fixed magnetic circuit portion comprises a first magnetic flux collecting yoke and a second magnetic flux collecting yoke disposed to face each other via a magnetic gap in which the magnetism detector is disposed,
   the shield is disposed between the first magnetic flux collecting yoke and the second magnetic flux collecting yoke via respective predetermined gaps, the shield is configured to guide flux leakage generated in the rotating magnetic circuit portion between the first magnetic flux collecting yoke and the second magnetic flux collecting yoke, and
   the shield, the first magnetic flux collecting yoke, and the second magnetic flux collecting yoke are arranged outside the first soft magnetic ring and the second soft magnetic ring in a radial direction.

2. The torque sensor as defined in claim 1, wherein
   an entirety of the magnetism detector is completely located on a first side of the shield, and
   an entirety of the rotating magnetic circuit portion is completely located on a second side of the shield, the second side opposite to the first side.

3. The torque sensor as defined in claim 1, wherein
   the first shaft and the second shaft are rotatable about a common rotation axis, and
   an entirety of the magnetism detector is farther from the rotation axis than the shield.

4. The torque sensor as defined in claim 1, wherein an inner peripheral surface of the shield is coplanar with inner peripheral surfaces of the first magnetic flux collecting yoke and the second magnetic flux collecting yoke.

5. A torque sensor that detects torque acting on a torsion bar that connects a first shaft and a second shaft, which are supported in a housing to be free to rotate, comprising:
   a magnetism generation portion that rotates together with the first shaft;
   a rotating magnetic circuit portion that rotates together with the second shaft;
   a fixed magnetic circuit portion fixed to the housing;
   a magnetism detector that detects a magnetic flux density guided from the magnetism generation portion to the fixed magnetic circuit portion through the rotating magnetic circuit portion in accordance with torsional deformation of the torsion bar; and
   a shield disposed between the rotating magnetic circuit portion and the magnetism detector, the shield being configured to shield the magnetism detector magnetically,
   wherein
   the rotating magnetic circuit portion comprises a first soft magnetic ring and a second soft magnetic ring to which magnetic flux generated by the magnetism generation portion is guided in accordance with the torsional deformation of the torsion bar, the fixed magnetic circuit portion comprises a first magnetic flux collecting ring and a second magnetic flux collecting ring provided along respective outer peripheries of the first soft magnetic ring and the second soft magnetic ring, the shield is disposed between the first magnetic flux collecting ring and the second magnetic flux collecting ring via respective predetermined gaps, the shield is configured to guide flux leakage generated in the rotating magnetic circuit portion between the first magnetic flux collecting ring and the second magnetic flux collecting ring, and the shield is arranged outside the first soft magnetic ring and the second soft magnetic ring in a radial direction.

6. The torque sensor as defined in claim 5, wherein the shield has a curvature radius substantially identical to curvature radiuses of the first magnetic flux collecting ring and the second magnetic flux collecting ring.

7. The torque sensor as defined in claim 5, wherein the shield has a thickness substantially identical to thicknesses of the first magnetic flux collecting ring and the second magnetic flux collecting ring.

8. A torque sensor that detects torque acting on a torsion bar that connects a first shaft and a second shaft, which are supported in a housing to be free to rotate, comprising:
 a magnetism generation portion that rotates together with the first shaft;
 a rotating magnetic circuit portion that rotates together with the second shaft;
 a fixed magnetic circuit portion fixed to the housing;
 a magnetism detector that detects a magnetic flux density guided from the magnetism generation portion to the fixed magnetic circuit portion through the rotating magnetic circuit portion in accordance with torsional deformation of the torsion bar; and
 a shield disposed between the rotating magnetic circuit portion and the magnetism detector, the shield being configured to shield the magnetism detector magnetically,
 wherein the fixed magnetic circuit portion comprises a first magnetic flux collecting yoke and a second magnetic flux collecting yoke respectively including a first projecting portion and a second projecting portion disposed to face each other via a magnetic gap in which the magnetism detector is disposed,
 the first magnetic flux collecting yoke and the second magnetic flux collecting yoke respectively include a first extension portion and a second extension portion formed by extending respective parts thereof, and
 the shield is constituted by the first extension portion and the second extension portion, which are disposed to face each other via a predetermined gap.

9. The torque sensor as defined in claim 1, wherein the shield has a curvature radius substantially identical to curvature radiuses of inner peripheral surfaces of the first magnetic flux collecting yoke and the second magnetic flux collecting yoke.

10. A torque sensor that detects torque acting on a torsion bar that connects a first shaft and a second shaft, which are supported in a housing to be free to rotate, comprising:
 a magnetism generation portion that rotates together with the first shaft;
 a rotating magnetic circuit portion that rotates together with the second shaft;
 a fixed magnetic circuit portion fixed to the housing;
 a magnetism detector that detects a magnetic flux density guided from the magnetism generation portion to the fixed magnetic circuit portion through the rotating magnetic circuit portion in accordance with torsional deformation of the torsion bar; and
 a shield disposed between the rotating magnetic circuit portion and the magnetism detector, the shield being configured to shield the magnetism detector magnetically,
 wherein
 the rotating magnetic circuit portion comprises a first soft magnetic ring and a second soft magnetic ring to which magnetic flux generated by the magnetism generation portion is guided in accordance with the torsional deformation of the torsion bar,
 the fixed magnetic circuit portion comprises a first magnetic flux collecting ring and a second magnetic flux collecting ring provided along respective outer peripheries of the first soft magnetic ring and the second soft magnetic ring,
 the first magnetic flux collecting ring and the second magnetic flux collecting ring respectively include a first extension portion and a second extension portion formed by extending respective parts thereof, and
 the shield is constituted by the first extension portion and the second extension portion, which are disposed to face each other via a predetermined gap.

\* \* \* \* \*